United States Patent
Miyori et al.

(10) Patent No.: US 7,130,782 B2
(45) Date of Patent: *Oct. 31, 2006

(54) GAS FLOW SIMULATION METHOD

(75) Inventors: Akio Miyori, Hyogo (JP); Masaki Shiraishi, Hyogo (JP); Kazuhiro Fujisawa, Hyogo (JP); Takahiro Sajima, Hyogo (JP)

(73) Assignee: SRI Sports Limited, Kobe (JP)

( * ) Notice: Subject to any disclaimer, the term of this patent is extended or adjusted under 35 U.S.C. 154(b) by 857 days.

This patent is subject to a terminal disclaimer.

(21) Appl. No.: 10/122,327

(22) Filed: Apr. 16, 2002

(65) Prior Publication Data

US 2003/0040894 A1    Feb. 27, 2003

(30) Foreign Application Priority Data

May 16, 2001   (JP)   ............... 2001-146310
May 31, 2001   (JP)   ............... 2001-165869

(51) Int. Cl.
  G06G 7/48   (2006.01)
  A63B 57/00  (2006.01)
  A63B 39/00  (2006.01)
  A63B 37/12  (2006.01)
  A63B 37/14  (2006.01)

(52) U.S. Cl. ............... 703/9; 703/1; 703/6; 473/199; 473/352; 473/378

(58) Field of Classification Search ............ 703/9, 703/6; 473/378, 199, 352; D21/319
See application file for complete search history.

(56) References Cited

U.S. PATENT DOCUMENTS 6,913,549 B1 *  7/2005  Yagley et al. ............... 473/378

2002/0147573 A1   10/2002   Miyori

FOREIGN PATENT DOCUMENTS

JP   06-194242      7/1994
JP   2002-250739 A  9/2002

OTHER PUBLICATIONS

Bearman et al., "Golf Ball Aerodynamics" Imperial College of Science London U.K. 1976. p. 112-122.*
Ryutaro Himeno et al.; RIKEN; Review No. 25; Nov. 1999; pp. 124-127.

* cited by examiner

Primary Examiner—Paul L. Rodriguez
Assistant Examiner—Thomas Stevens
(74) Attorney, Agent, or Firm—Birch, Stewart, Kolasch & Birch, LLP

(57) ABSTRACT

A gas flow simulation method includes setting an imaginary object model such as a sphere model having at least one concavity, convexity, groove or projection formed thereon by means of a computer. A spatial part on a periphery of the imaginary object model is set. A surface of the imaginary object model and the spatial part is divided into a large number of blocks to form a large number of latticed divisions by lattice points. A gas flows to the imaginary object model from one direction of the spatial part. A motion element of a flow of the gas in the spatial part for each latticed division or for each latticed point is computed, with the gas flowing in the spatial part and passing along the surface of the imaginary object model. The flow of the gas on the periphery of the imaginary object model is simulated.

14 Claims, 30 Drawing Sheets

Prior Art

GAS FLOW SIMULATION METHOD

BACKGROUND OF THE INVENTION

1. Field of the Invention

The present invention relates to a gas flow simulation method. More particularly, the present invention relates to a gas flow simulation method for simulating the behavior of a gas flow flowing along the surface of the spherical model when the imaginary object model such as spherical model flies in rotation in a gas. To this end, imaginary object model such as a spherical model having concavities or grooves formed on the surface thereof is set by means of a computer.

2. Description of the Related Art

It is known that turbulence of a gas flow such as separation of a gas occurs on the periphery of an object such as a sphere that is used in a ball game, while the sphere is flying in the gas. In the case where there is a change in the configuration of the surface of the sphere or in the case where the sphere is flying in rotation, the turbulence of the gas flow becomes more complicated. The turbulence of the gas flow affects the flight performance of the object and in particular, the flight distance of the sphere such as a ball which is used in ball games.

For example, in the case of the golf ball, a large number of dimples (concavities) formed on the surface thereof affect its aerodynamic characteristic greatly. Thus it is important to recognize the casual relation between the aerodynamic characteristic of the golf ball and the size of the dimples, the arrangement thereof as well as combinations of the dimples having various sizes and configurations. It is frequent that a high-class player applies a backspin to the golf ball intentionally. Thus it is particularly important to recognize the aerodynamic characteristic of the golf ball during its rotation.

To evaluate how the flight characteristic of the golf ball changes according to the difference in the size of the dimples formed on the surface of the golf ball, the arrangement thereof as well as combinations of the dimples having various sizes and configurations, many golf balls having different dimple specifications are made on an experimental basis, and experiments of hitting the golf balls thus made are conducted to measure flight distances thereof and the like. In this manner, the aerodynamic characteristic of the golf ball is determined. In recent years, there are proposed methods and apparatuses of measuring the lift and drag coefficients of the golf ball and spheres to analyze the aerodynamic characteristic thereof by placing them in a wind tunnel instead of conducting ball-hitting experiments.

Disclosed in Japanese Patent Application Laid-Open No. 6-194242 is the method and apparatus for measuring the drag and lift thereof by utilizing a wind tunnel to analyze the aerodynamic characteristic of the golf ball. As shown in FIG. 30, in the measuring apparatus 1 placed in the wind tunnel together with the golf ball, the motor 3 rotates the aluminum shaft 2 having the object T such as the golf ball installed on its upper end to measure its flight characteristic, and the strain of the aluminum shaft 2 is detected by the strain-type detector 4, for detecting the axial three components of a force, disposed on the periphery of the aluminum shaft 2. When the object T is rotated in an gas flow generated in the wind tunnel, the object T in the wind tunnel has a state pseudo to an actual flight state. The lift coefficient of the object T and its drag coefficient are derived from a measured strain amount of the aluminum shaft 2 to analyze the flight characteristic of the object T. In the measurement which is performed by the measuring apparatus 1, gas flows are generated in various conditions in the wind tunnel and the aerodynamic characteristic can be measured in various conditions.

To select the configuration and the like of the dimple simply and effectively, the experimental method of forming concavities and convexities on the rotating sphere is proposed in Japanese Patent Application Laid-Open No. 6-194242. The method necessitates preparation of models on an experimental basis, thus leading to a high cost and much time.

In the measurement of the aerodynamic characteristic of the golf ball by conducting experiments of hitting the golf ball made on an experimental basis and of placing the golf ball in the wind tunnel, it is difficult to make the golf ball on an experimental basis in the case where concavities or grooves are formed on the surface of an object to be measured in its flight performance and also difficult to prepare a large number of objects having different patterns in the disposition and size of the concavities or grooves and accumulate data obtained from the measurement. Thus the proposed measuring method and apparatus has a problem that it is impossible to make a detailed analysis as to how the gas flow is affected by the configuration and size of individual dimples formed on the surface of the golf ball and the arrangement of the dimples.

The conventional method of evaluating the aerodynamic characteristic of the golf ball is capable of evaluating characteristics of the gas flow after it changes but is incapable of clarifying the casual relation between the configuration of a newly designed dimple and the aerodynamic characteristic. Therefore frequently, the newly designed golf ball has performance different from the desired performance. In this case, a re-designed golf ball is made on an experimental basis to check the aerodynamic characteristic thereof. As such, the conventional measuring method and apparatus has a problem that it takes much time and money to develop a golf ball having a new specification of dimples.

The aerodynamic characteristic of an object is evaluated not by making it on an experimental basis but by a simulation using a computer. But the conventional simulation method is incapable of accurately expressing the motion of the object flying in rotation in a gas by simulation and apprehending the aerodynamic characteristic thereof. It is very difficult to express the motion of the sphere such as the golf ball having concavities or convexities formed thereon, when it flies in rotation in the gas.

SUMMARY OF THE INVENTION

The present invention has been made in view of the above-described problem. Thus it is an object of the present invention to visually evaluate flow of a gas on the periphery of an object flying in rotation and thus efficiently develop and design the object by clarifying the flow of the gas on the periphery of the object such as a golf ball moving in the gas in rotation and by analyzing how the configuration of the surface of the sphere affects the flow of the gas on the periphery of the object such as a golf.

To achieve the purpose, the present invention provides a gas flow simulation method comprising the steps of setting an imaginary object model having at least one concavity, convexity, groove or projection formed thereon by means of a computer, setting a spatial part on a periphery of the imaginary object model, dividing a surface of the imaginary object model and the spatial part into a large number of latticed divisions by means of lattice points, setting the latticed divisions on the surface of the imaginary object model or in a portion of the spatial part in the vicinity of the imaginary object model in supposition of a state in which the imaginary object model is rotating, flowing a gas to the imaginary object model from one direction of the spatial part, computing a motion element of a flow of the gas in the spatial part for each latticed division while the gas is flowing in the spatial part and passing along the surface of the imaginary object model, and simulating the flow of the gas on the periphery of the imaginary object model.

As described above, in the present invention, the imaginary object model having concavities or grooves corresponding to dimples of a golf ball is set in an imaginary space of a computer, the spatial part is formed on the periphery of the imaginary object model; and the latticed divisions are set on the surface of the imaginary object model or in a portion of the spatial part in the vicinity of the imaginary object model in supposition of the state in which the imaginary object model is rotating. Therefore by executing the simulation of the gas flow which flows successively into the spatial part by using the computer, it is possible to analyze the gas flow on the periphery of the imaginary object model when the imaginary object model having the concavities or the grooves formed thereon is rotating. Accordingly it is easy to apprehend how the gas flow is influenced in dependence on the number of rotations of the imaginary object model and the concavities or the grooves formed thereon during flight of the imaginary object model.

It is possible to vary the configuration and size of the concavity, the convexity, the groove or the projection formed on the imaginary object model and form them in combination thereof appropriately in dependence on the configuration of the imaginary object model which is used to analyze a gas flow.

The imaginary object model is simulated as a spherical model. The latticed divisions are set on the surface of the imaginary object model or in a portion of the spatial part in the vicinity of the imaginary object model in supposition of the state in which the imaginary object model is rotating. Thereby it is possible to easily apprehend how the gas flow on the periphery of the spherical model is influenced in dependence on the number of rotations of the spherical model and the rotation thereof during its flight. Since the rotational axis of the sphere can be selected in any directions, it is possible to analyze the gas flow such as separation of the gas on the periphery of the sphere irrespective of directions in the rotation of the sphere by appropriately setting the inflow direction of the gas and the direction in which the rotation of the sphere is considered. Accordingly it is possible to apprehend the aerodynamic characteristic when various kinds of spheres such as the golf ball to which a backspin has been applied flies in rotation. Since the rotational axis of the sphere can be selected in any directions, it is possible to set the rotational axis as desired in dependence on the configuration of the surface of the sphere and a content to be simulated.

The imaginary object model is supposed to be a columnar model. The spherical model is simulated in supposition of a state in which the columnar model rotates on its axis. When the columnar model is cut at a plane parallel with the bottom surface thereof, the sectional configuration of the cut surface is circular. Thus the result of the simulation of the columnar model is applicable to the analysis of a gas flow on the periphery of an object such as a sphere having the same sectional configuration as that of the cut surface. Thereby by simulating the spherical model, it is possible to apprehend aerodynamic characteristic of the sphere such as the golf ball when it flies in rotation.

The motion element of the gas flow in the spatial part is computed for each latticed division. That is, by using various methods, the motion element is computed for each lattice, each lattice point, the center of each lattice, each lattice surface, a side of each lattice connecting the lattice points to each other, and an arbitrary point disposed between the lattice points.

It is preferable that the spatial part is divided into a plurality of blocks. In the case where the spatial part is set in terms of blocks, it is easy to set the latticed division and perform computations.

It is preferable that the latticed division is formed with a structured lattice. Although simulation can be accomplished even in the case where the latticed divisions are formed with an unstructured lattice, it is possible to obtain a precise result from the simulation in the case where the latticed division is formed with the structured lattice. The structured lattice allows computation precision to be high and useful in the simulation of an object such as the golf ball having a comparatively simple configuration on its surface. It is possible to use the structured lattice and the unstructured lattice in combination. The ratio between the structured lattice and the unstructured lattice can be set appropriately in dependence on a model or a content to be simulated.

In the simulation, it is possible to simulate the state in which the imaginary object model is flying in rotation at a velocity V in consideration of a relative velocity. It is possible to simulate this state as a state in which gas flowing at a velocity V passes the imaginary object model rotating at a certain position.

The motion element of the gas flow in the spatial part is computed for each latticed division when a gas passes the surface of the imaginary object model during its flow in the spatial part, with the imaginary object model rotating at a certain position. In the present invention, by the following method, it is possible to analyze the imaginary object model while it is rotating.

In the present invention, the rotation of the imaginary object model is expressed and simulated by any one of the following three methods or in combination thereof.

① Method of Rotating Lattice Disposed in the Vicinity of Imaginary Object Model

In this method, the spatial part is divided into a plurality of regions. For example, the spatial part is divided into a region 1 including the imaginary object model and a region 2 disposed on the periphery of the region 1. The rotation of the region 1 indicates the rotation of the imaginary object model. In the gas flow in the vicinity of the interface between the two regions 1 and 2, physical amounts thereof such as a velocity and a pressure (inflow mass, momentum, and the like) are computed by arithmetically interpolating the physical amounts by a secondary linear interpolation to transmit the gas flow from the region 1 to the region 2 and vice versa. In addition, the spatial part is divided into a plurality of blocks, for example, four or six blocks which can be connected to each other by overlapping them each other. Thus modeling and computations can be easily accomplished in the entire spatial region.

To perform the interpolation, it is preferable to dispose the latticed divisions by overlapping them each other in the vicinity of the interface between the two regions 1 and 2. It is possible to form one spatial part not by forming a plurality of latticed divisions but by combining the latticed divisions with each other in such a way that a plurality of regions overlap on each other.

More specifically, it is preferable that the region 1 is circular to rotate it around the imaginary object model. To make the region 2 stationary, the region 2 may be quadrilateral. In the case where the region 2 is circular, the more distant the region 2 is from the imaginary object model, the longer it takes to perform computations of its rotation. Therefore in the case where the region 2 is quadrilateral, it takes a short time to perform a computation. It is preferable to set the region 2 wide in a portion, of the spatial part, disposed at the downstream side (the side to which the gas flows after the gas passes the surface of the imaginary object model) of the imaginary object model. Thereby there can be provided the latticed divisions for simulating turbulence and behavior of the gas flow after the gas flow passes the surface of the imaginary object model. Therefore the turbulence and behavior of the gas flow can be simulated with high precision.

Supposing that the diameter of a sectional circle of the spherical model or the diameter of the circle at the bottom surface of the columnar model is D, it is preferable that the sectional configuration of the region 1 is a circle coaxial with the sectional circle of the spherical model and having a radius not less than 1D nor more than 5D. The reason the radius of the region 1 is set in the above-described range is as follows: If the radius of the region 1 is less than 1D, simulating precision in the vicinity of the surface of the spherical model becomes low, because the distance between the region 2 and the spherical model is short, which adversely affects transfer of the gas flow between the region 1 and the region 2. On the other hand, if the radius of the region 1 is more than 5D, it is necessary to perform complicated computations. It is preferable to form the region 2 in such a way that the distance between the center of the spherical model and a radial end of the region 2 or the distance between the radial end of the region 2 at a plane parallel with the bottom surface of the columnar model and the center of the circle at the bottom surface of the columnar model is less than 20D. If the distance is more than 20D, it is necessary to perform complicated computations and it takes much time to perform them.

The interpolation of the physical amounts at the interface between adjacent regions is described in detail below. In the case where the spatial part is divided into a plurality of portions, in the case where the latticed divisions overlap each other or in the case where the interface of one region is periodically coincident with that of the other region during the rotation of the latticed divisions, it is necessary to interpolate the physical amounts such as the velocity, the pressure, and the like in the vicinity of the interface. To this end, it is possible to use any of a primary linear interpolation method, a secondary linear interpolation method, a spline interpolation method, and the like. The interpolation eliminates a rotation-caused deviation of the physical amount such as the velocity, the pressure, and the like between the regions and transmit the physical amounts between the regions accurately. Thereby it is possible to accurately evaluate the rotational movement.

② Method of Deforming Lattice in the Vicinity of Imaginary Object Model

In this method, the position of the latticed division after it rotates is estimated, and its rotation is expressed by deforming it in such a way as to indicate its configuration at the estimated position. Thereby it is possible to accurately evaluate the rotational movement of the latticed division.

③ Method of Imparting Rotation to Imaginary Object Model as Boundary Condition

In this method, to simply express the rotation of the imaginary object model, a rotational velocity component is set on the surface of the imaginary object model as a boundary condition. That is, the velocity of the imaginary object model is set to zero relative to the flow of gas. In consideration of the rotation of the imaginary object model, a certain point of the velocity of the surface of the imaginary object model is set to $r\omega$ (r: the distance between the rotational axis of the imaginary object model and the point, $\omega$ is an angular velocity in its rotational motion). Thereby it is possible to accurately evaluate the rotational movement of the imaginary object model.

A large number of latticed divisions are formed by dividing the surface of the imaginary object model and the spatial part into blocks respectively. It is preferable to form the latticed division as a tetrahedron or a pentahedron, a combination of the tetrahedron and the pentahedron or a combination of the tetrahedron, the pentahedron, and a hexahedron. It is possible to accomplish a simulation even in the case where the latticed division is formed as the hexahedron. But by adopting the above-described combination, it is possible to make the latticed divisions dense in only a portion that is to be finely analyzed. Thereby it is easy to cope with the rotation of the imaginary object model and improve simulating accuracy.

The motion element of the gas flow is the velocity of the gas flow in each axial direction of a three-dimensional space coordinate system, the direction thereof, and the pressure thereof applied to the surface of the imaginary object model. The motion element is computed at each slight time by using the equation of the law of conservation of mass such as the equation of continuity regarding the gas flow and the equation of the law of conservation of momentum such as the equation of motion and the Navier-Stokes equation regarding the gas flow.

As the simulation method which is carried out in the present invention, a computation is performed at each slight time by using the discrete equation of continuity and the discrete Navier-Stokes equation for each of latticed divisions formed by dividing the spatial part. Thereby the numerical value of each of the motion elements is found. Then the gas flow regarding the entire spatial part is simulated by combining the results of the computations for the respective latticed division with each other. In this manner, it is possible to analyze the change of the gas flow. In the case where the change of the gas flow with the elapse of time and situations of the gas flow in different time zones are simulated, computations are sequentially performed forward at each slight time by using the two equations. Thereby it is possible to simulate the change of the gas flow in a required time zone.

When the equations are made discrete in consideration of the rotation of the imaginary object model, it is necessary to alter denominators of the two equations at each slight time in correspondence to the rotation thereof. In the case where the imaginary object model does not rotate, the position of every latticed division is stationary. Thus the denominators of the two equations are always constant. On the other hand, in the case where the imaginary object model rotates, with the movement of the latticed division, it is necessary to make the evaluation of the denominators of the two equations correspondent to the positional movement of the latticed division and make reference to the coordinate value and the physical amount at its moved position. In consequence, the denominators of the equations are altered.

Based on the results of the computations, the flow direction of the gas on the periphery of the imaginary object model and its flow velocity are analyzed by visualizing them in terms of a vector direction and a vector length respectively. Based on the results of the computations, the pressure distribution in the gas flow on the periphery of the imaginary object model is also analyzed by visualizing the pressure distribution in terms of an isobaric line or a surface connecting equal pressures to each other. Based on the results of the computations, the vorticity distribution in the gas flow on the periphery of the imaginary object model is also analyzed by visualizing the vorticity distribution in terms of an isopleth of vorticities or a surface connecting equal vorticities to each other. It is possible to visualize various motions of the gas flow by replacing numerical values obtained by the computations with vectors, the isobaric line, and the like.

The visualization allows clear apprehension of the change of the gas flow which occurs by the configuration and the like of the concavity or the groove of the rotating imaginary object model. The visualization also allows determination of the casual relation between the aerodynamic characteristic and the concavity or the groove of the rotating imaginary object model. In addition, based on the results of the computations, it is possible to deal with a stream line, a trajectory, a particle trace, and volume rendering in the visualization of the gas flow on the periphery of the imaginary object model. By supplying the numerical values obtained by the computations to a dedicated visualizing program or a general-purpose visualizing software commercially available, it is possible to visualize various situations corresponding to the obtained numerical values, in dependence on a purpose. The volume rendering means color classification of coordinates of a certain position of a space by physical amounts (pressure, density, and the like) to indicate the difference in a pressure and a density in terms of the difference in color.

As described above, each latticed division can formed as a polyhedron such as a hexahedron, a pentahedron, a tetrahedron or the like by dividing the surface of the imaginary object model or the spatial part. Alternatively the polyhedrons may be appropriately combined with one another to divide the surface of the imaginary object model or the spatial part into latticed divisions.

As the method of making smoothly continuous equations discrete for each divided latticed division, any one of a finite difference method, a finite volume method, a boundary element method, and a finite element method may be used to perform a computation for each of intersections of lattices, the center of each lattice or the inside of each latticed division.

In a computation which can be performed at a comparatively low speed, it is possible to treat the gas as being uncompressible. Thus the computation can be accomplished by setting the density of the gas to a constant value. In the case where the gas is treated as being compressible, the density thereof may be treated as a variable. In this case, it is necessary to consider the equation of the principle of the conservation of energy.

The computation is performed by substituting numerical values into the equation of continuity and the Navier-Stokes equation which have been made discrete by the finite difference method or the like or by substituting thereinto a velocity value to which a turbulent velocity has been added by treating the gas flow as a turbulent model. In these computations, the velocity of the gas flowing on the surface of the imaginary object model is treated as a non-slip condition. Thus the velocity of the gas flowing in contact with the surface of the imaginary object model is set to zero. That is, v of the equation is the rotational velocity of the imaginary object model. The condition of the pressure applied to the surface of the imaginary object model, and the velocity and the pressure condition on the outward surface of the to-be-computed region are appropriately set in such a way as to prevent delay of an internal flow of the gas flow. As described above, in consideration of the rotation of the imaginary object model, the velocity of the gas in contact with the surface of the imaginary object model may be set to a value equal to the rotational velocity component of the imaginary object model.

The columnar model having an infinite length is computed by making the physical amount such as the velocity and the pressure of the gas on the upper surface of the columnar model equal to those of the gas on the lower surface thereof to thereby set the physical amount as a periodic boundary condition. The height of the spatial part is set equally to that of the columnar model. That is, the upper surface of the columnar model is coincident with that of the spatial part, and the lower surface of the columnar model is coincident with that of the spatial part. A point of the upper surface of the spatial part and a point of the lower surface thereof have data in common. An analysis is performed in a condition equivalent to the condition in which the spatial part is infinitely continuous.

The dimension of the spatial part in a range from the surface of the imaginary object model to an end of the spatial part is set to more than 10 times nor more than 10000 times as long as the dimension of the depth (the height of the convexity or the projection) of the concavity or the groove. Thereby it is possible to realize a simulation with high precision and computing efficiency. To analyze the influence of the configuration and the like of the concavity or the groove on the gas flowing on the periphery thereof, the dimension of the spatial part located outward from the surface of the imaginary object model to the end of the spatial part is required to be more than 10 times as long as the dimension of the depth of the concavity or the groove. To prevent much time from taking in the computation for the range in which the gas flows at a uniform velocity without being affected by the configuration and the like of the concavity or the groove, it is optimum to set the upper limit of the dimension of the spatial part to less than 10000 as long as the depth of the concavity or the groove.

The thickness of each of the latticed divisions of the spatial part located outward from the surface of the imaginary object model in a range less than $1/Re^{0.5}$ (Re is Reynolds number, Re=representative velocity×representative length/kinematic viscosity of gas) increases outward from the surface of the imaginary object model in a range of not less than $1/(1000 \cdot Re^{0.5})$ nor more than $1/Re^{0.5}$.

In the case where the rotation of the sphere is considered, the thickness of the latticed division indicates its length in the direction vertical to the rotational axis of the spherical model. The height of the latticed division indicates its length in the extension direction of the rotational axis of the spherical model. The width of the latticed division indicates its length in the rotational direction of the spherical model.

In the case where the rotation of the columnar model is considered, the thickness of the latticed division indicates its length in the same direction as the radial direction of a circle at the bottom surface of the columnar model. The height of the latticed division indicates its length in the same direction as the height direction of the columnar model. The width of the latticed division indicates its length in the same direction as the circumferential direction of a circle of the columnar model.

The neighborhood of the surface of the imaginary object model is the boundary layer in which the flow velocity of the gas changes greatly. Thus by finely dividing the latticed division located in the range below $1/Re^{0.5}$, it is possible to simulate the gas flow minutely and analyze in detail the relationship between the configuration and the like of the concavity or the groove and the change of the gas flow. On the other hand, the gas distant from the surface of the imaginary object model has a gentle change in its flow velocity. Thus an upper portion of the spatial part distant from the surface of the imaginary object model is divided into large latticed divisions as described above to reduce the number of computation times and enhance the computation efficiency. Thus it is possible to reduce the length of time required for the simulation.

To reliably check the influence of the configuration and the like of the concavity or the groove on the gas flowing on the periphery thereof, it is preferable to set the width of each latticed division to about not more than ¼ of the width (diameter, when the concavity is round) of the concavity or the groove. Because the dimension of the spatial part and that of the latticed division are set in a dimensionless space, numerical values are dimensionless and no units are added thereto. But when the simulation of the gas flow is performed on a golf ball, it is necessary to change dimensionless values to dimensional values. Thus an evaluation is made by adding an appropriate unit to the dimensionless values.

When a more detailed simulation is executed, the velocity distribution of the gas flow and its turbulent condition may be added to the gas flow as the inflow condition of the gas. When a portion of the spatial part disposed in the vicinity of the surface of the imaginary object model is sufficiently wide, it is possible to set a condition in which the inflow velocity of the gas is uniform. The direction of an inflow gas with respect to the imaginary object model can be appropriately set in dependence on a purpose of evaluation which is made by the simulation method. The upper portion of the spatial part distant from the surface of the imaginary object model is influenced in a lower extent by the configuration and the like of the concavity or the groove. Therefore a realistic simulation can be accomplished by setting the pressure of the gas flow which is applied to the surface of the imaginary object model to zero and the inflow and outflow velocity thereof to an equal velocity.

It is possible to apply the spherical model to a sphere having concavities or grooves formed thereon, for example, a golf ball having dimples formed thereon and make the result of the simulation of the gas flow on the periphery of the spherical model useful for designing the dimple of the golf ball. This is serviceable for designing the dimple of the golf ball flying in the gas, with a backspin applied thereto.

More specifically, when the gas flow on the periphery of the imaginary object model having the concavity, the convexity, the groove or the projection formed thereon is simulated to visualize it on the computer, it is possible to understand the flow situation of the gas flow on the periphery of the concavity, the groove or the like, easily determine whether the effect of the configuration and the like of the concavity, the groove or the like has caused the gas flow to change into a turbulent flow, and evaluate whether the designed size, disposition, and arrangement of the concavity, the groove or the like are optimum. The gas flow simulation method of the present invention is capable of finding the drag coefficient, the lift coefficient, and the moment coefficient of the imaginary object model. Since the moment coefficient can be found, the evaluation accuracy can be improved. The effect of the dimple of the golf ball is to reduce the resistance of the gas to the golf ball by making the boundary layer present in the neighborhood of the surface of the golf ball positively turbulent and moving the separation point of the gas flow rearward from the surface of the golf ball. Thus the result of the analysis can be effectively utilized. Consequently it is possible to evaluate the flight performance of the golf ball without making the golf ball on an experimental basis and conducting experiments and possible to eliminate waste of labor in designing the dimple. Thereby speedup of the development of golf ball can be accomplished, and the developing cost can be greatly reduced.

The result of the analysis made by the gas flow simulation of the present invention is useful for clarifying the flow of the gas on the periphery of the sphere such as the golf ball or a tennis ball, having the concavity or the groove formed thereon, which rotates when it flies in the gas and is applicable to clarification of the flow of the gas on the periphery of objects circular in the sectional configuration thereof.

The gas flow simulation method is recorded in the form of a program on a recording medium of a CD, a DVD or the like. The program is read from the CD or the DVD by using a general-purpose computer. Thereby the computer can function as the gas flow simulation apparatus.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The embodiments of the present invention will be described below with reference to the drawings.

Figure 1:
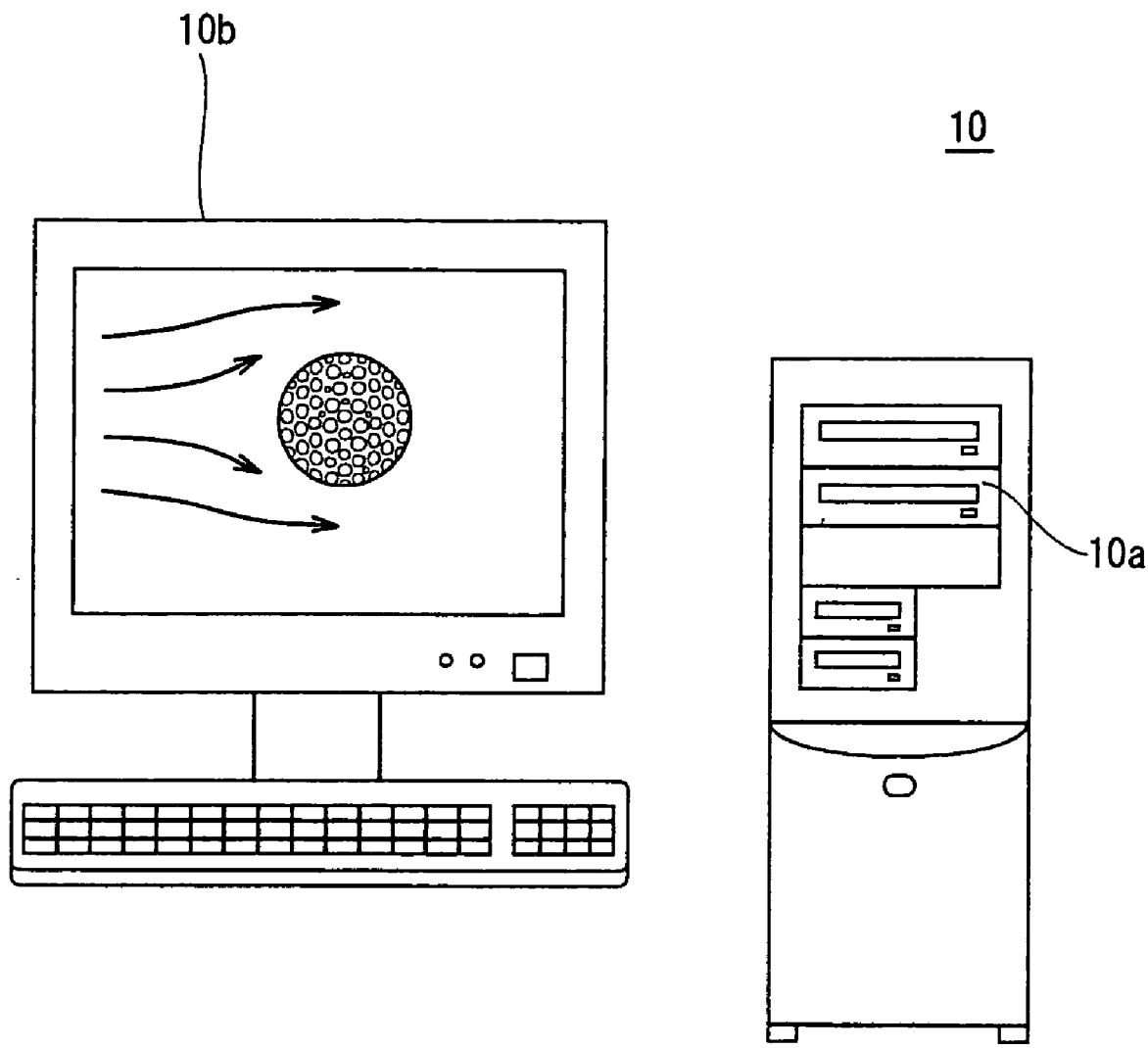
FIG. 1 is a schematic view showing a computer for carrying out the gas flow simulation method of the present invention.

FIG. 1 shows a simulation apparatus 10 for carrying out the gas flow simulation method of the present invention. The simulation apparatus 10 utilizes a computer in a hardware manner. The computer includes a display 10b and a body 10a having a CPU, a memory, and the like. In a software manner, the memory of the body 10a stores the program for the simulation method of the present invention. Various kinds of simulations of a gas flow can be accomplished by executing the program.

Figure 2:
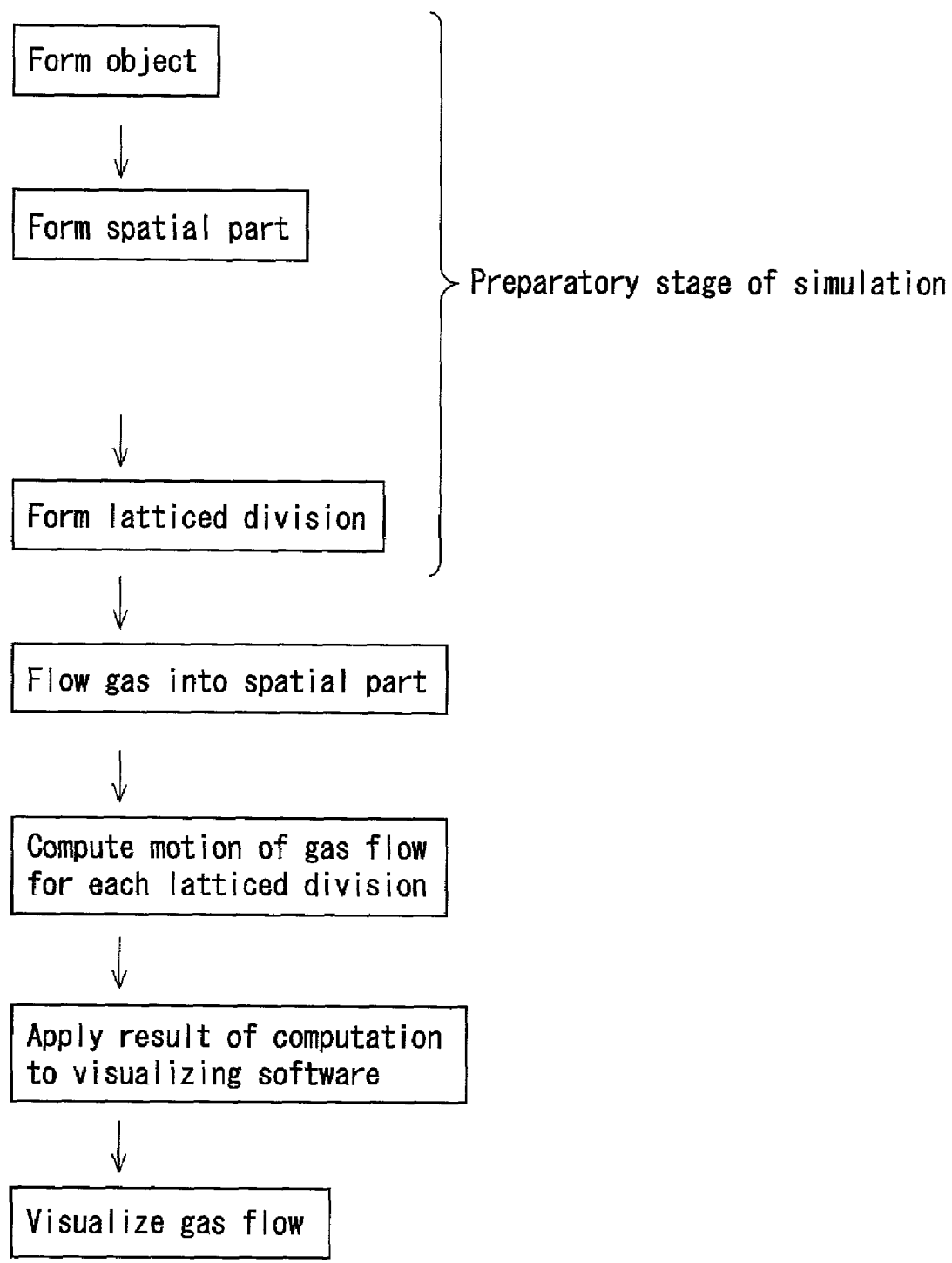
FIG. 2 is a flowchart showing the gas flow simulation method of the present invention.
Figure 3:
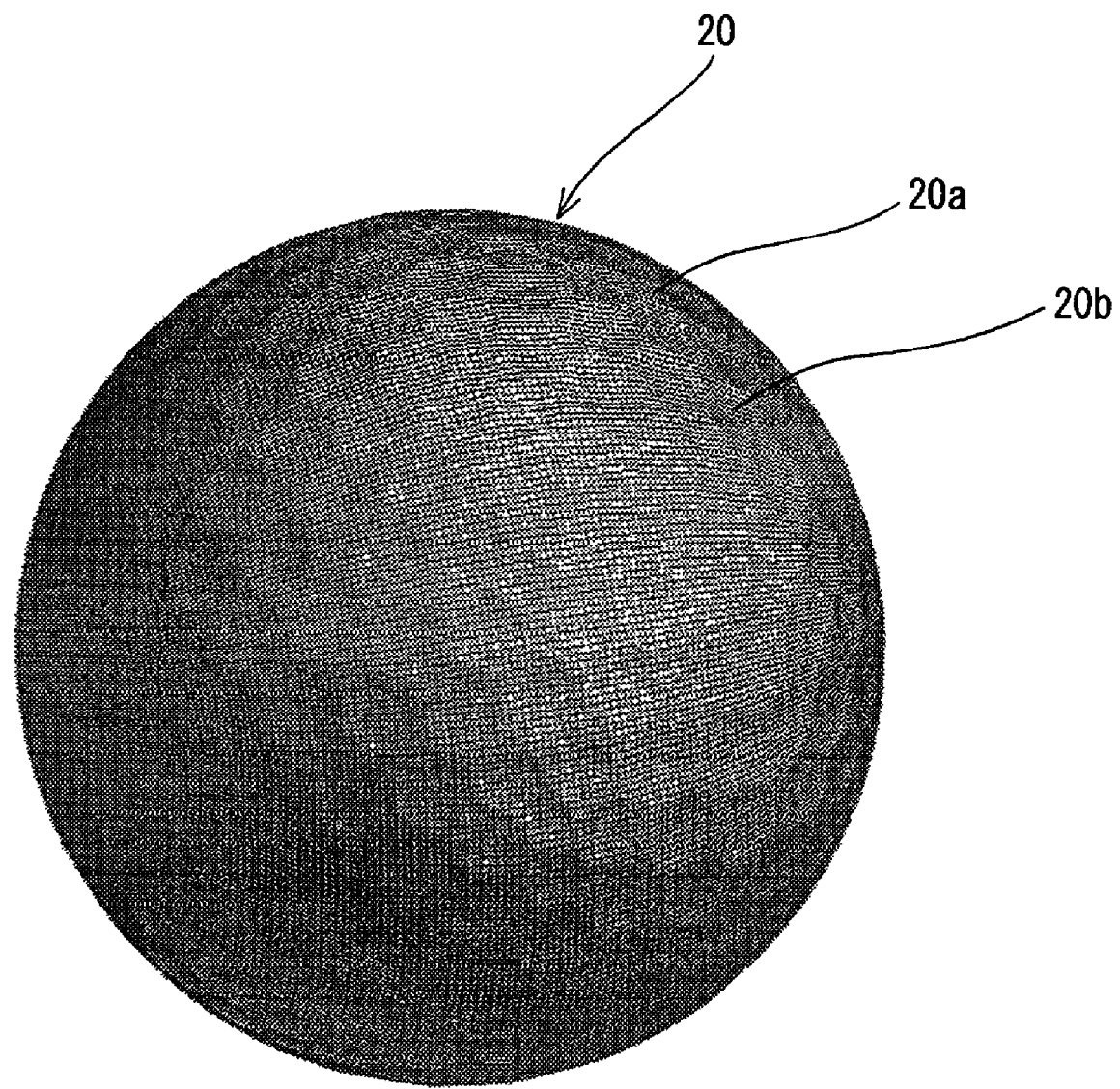
FIG. 3 shows a spherical model to be simulated.
Figure 4:
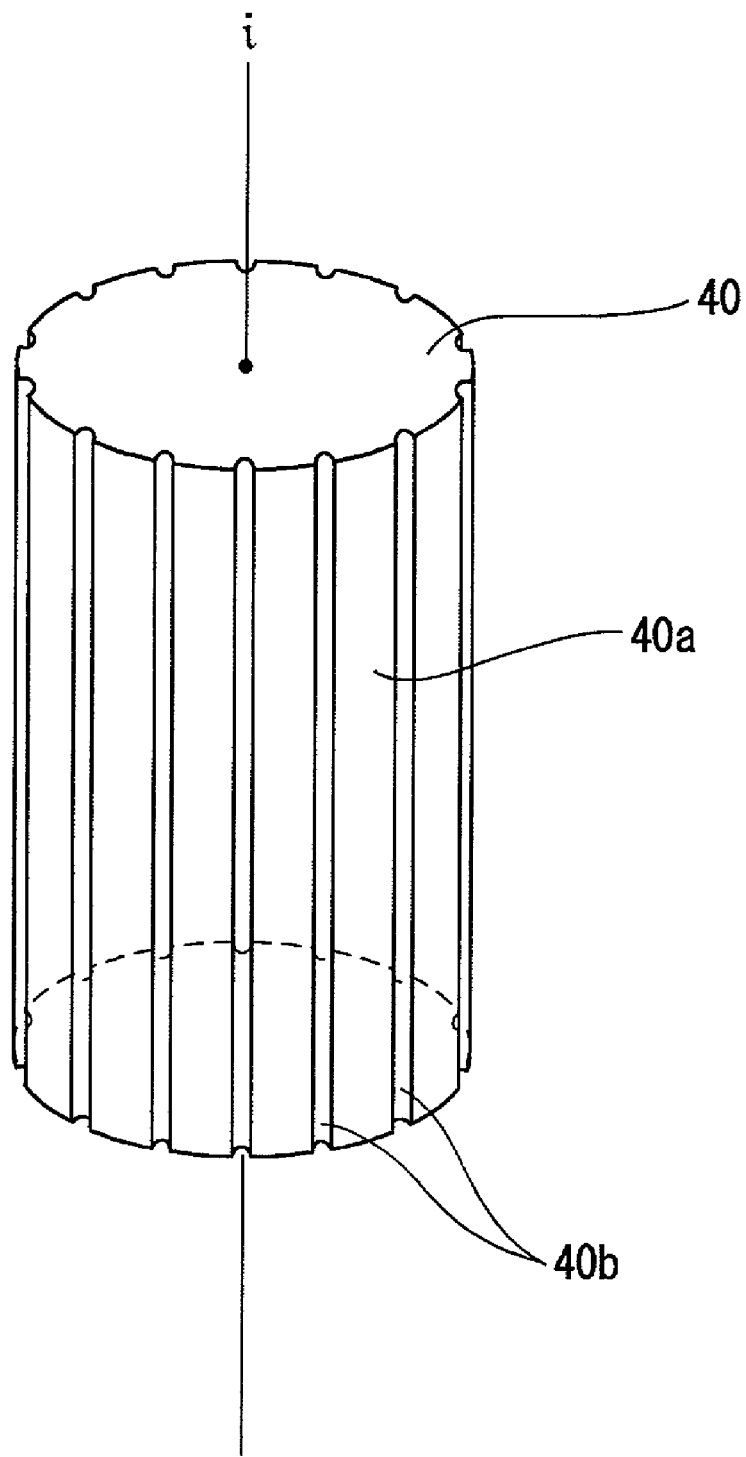
FIG. 4 is a schematic view showing a columnar model to be simulated.
Figure 5:
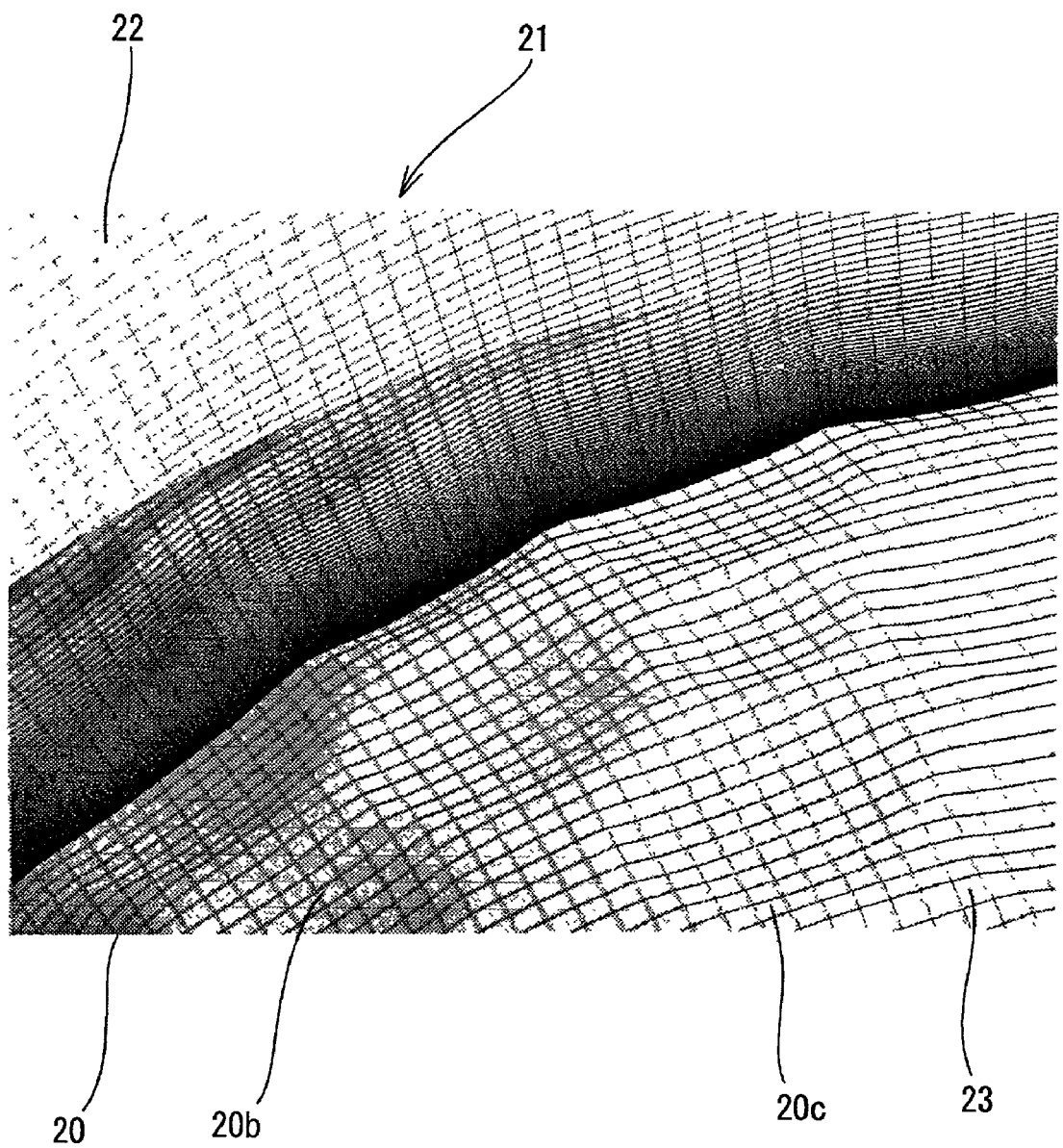
FIG. 5 shows the state of the surface of the spherical model.
Figure 6:
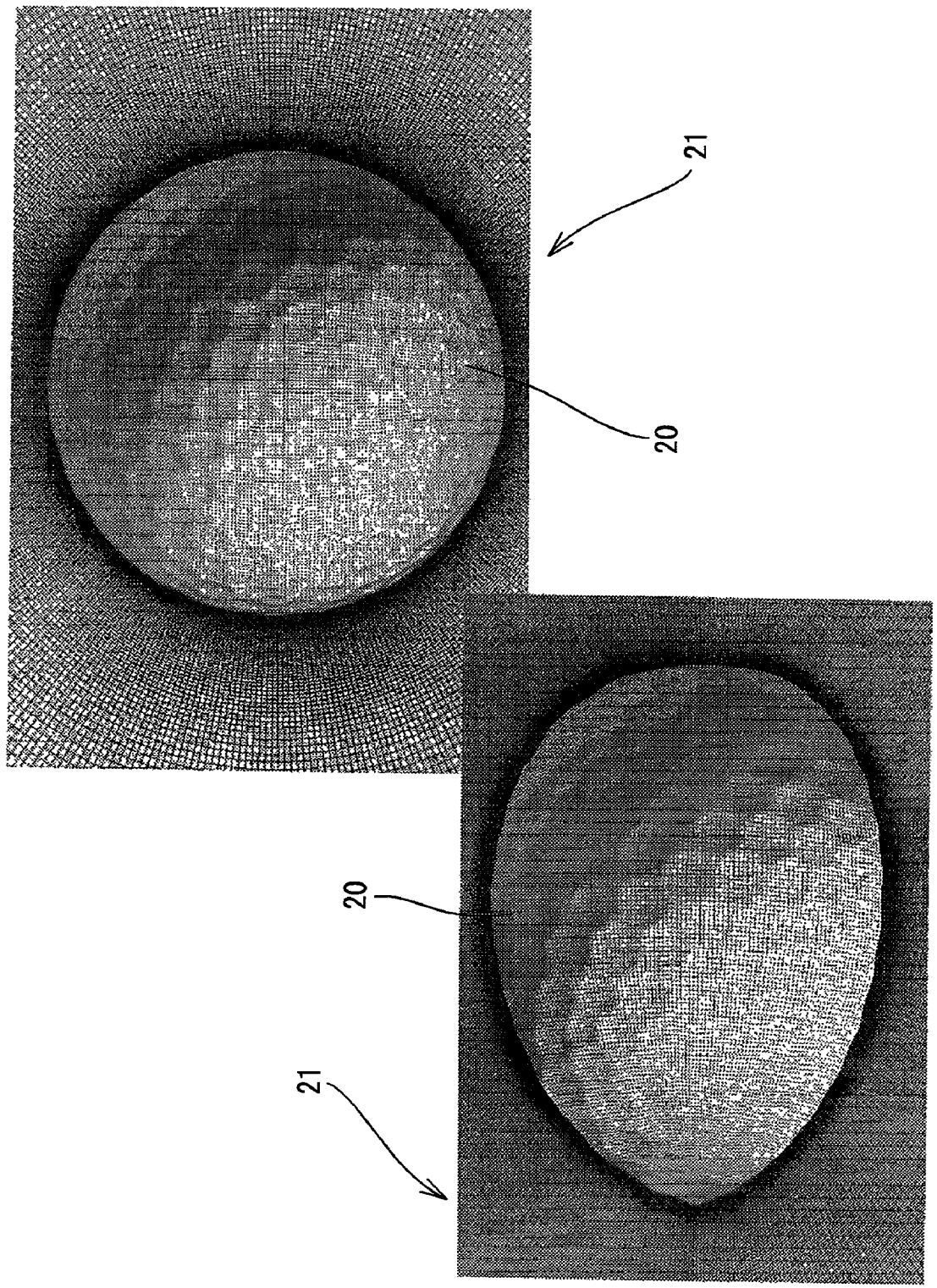
FIG. 6 shows the state of mesh in the spherical model and a spatial part.
Figure 7:
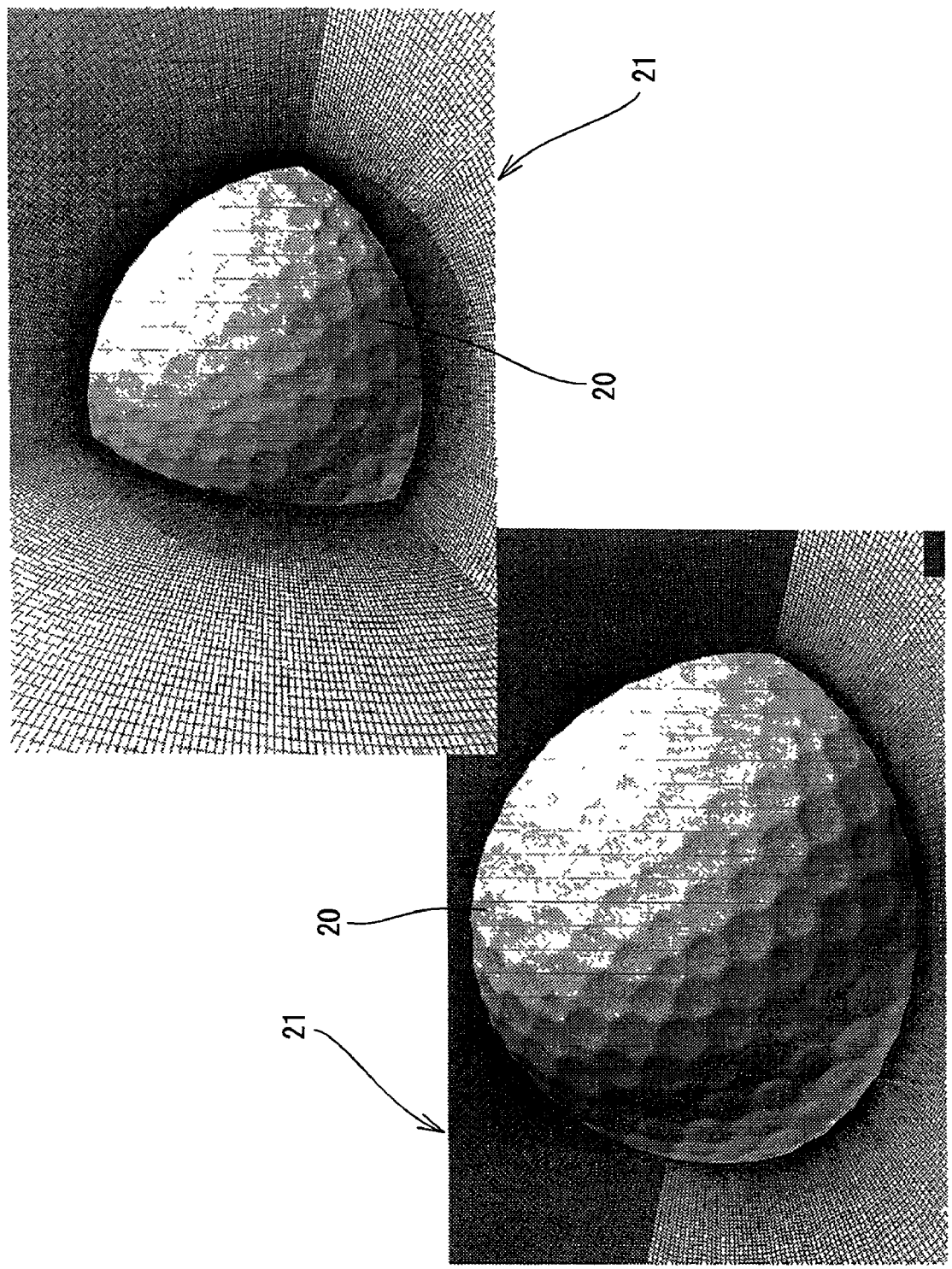
FIG. 7 shows the state of a mesh in the spatial part.
Figure 8:
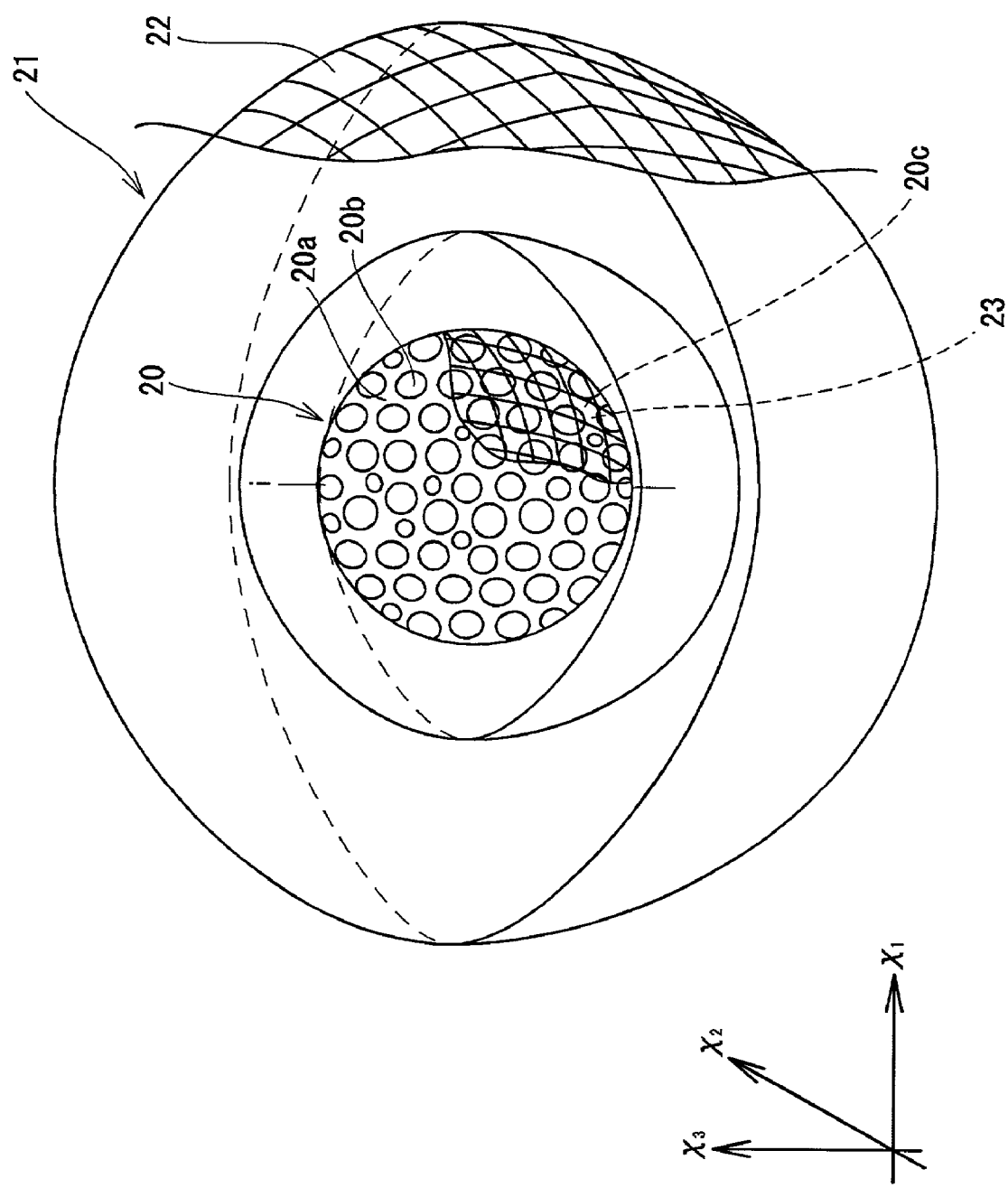
FIG. 8 is a schematic view showing the set state of the spherical model and the spatial part.

FIG. 2 shows the flow of the simulation method to be carried out by the program stored in the simulation apparatus 10. Initially, as shown in FIGS. 3 and 4, by using a figure-drawing software contained in the program, the simulation apparatus 10 generates a spherical model 20 and a columnar model 40 three-dimensionally as objects to be used for a gas flow simulation on an imaginary space of the computer as a preparatory stage of the simulation. The figure-drawing software is capable of shaping the surface of the spherical model 20 and the columnar model 40 into various configurations, for example, irregularities or the like.

In the first embodiment, the spherical model 20 is used as an imaginary object. Three hundred and ninety concavities 20b are formed entirely on a surface 20a of the spherical model 20. The spherical model 20 is generated as a golf ball. The concavity 20b is generated as a dimple. In this manner, the spherical model 20 to be used for the gas flow simulation is set on the imaginary space of the computer.

In the second embodiment, the columnar model 40 is used the imaginary object. Thirty grooves 40b are formed entirely on the circular surface 40a of the columnar model 40 at regular intervals and parallel with an axis i of the columnar model 40 (in the drawing, the number of the grooves is reduced to allow the drawing to be seen clearly). In this manner, the columnar model 40 to be used for the gas flow simulation is set on the imaginary space of the computer.

As shown in FIGS. 5 through 8, to model the space for simulating the gas flow, a spatial part 21 is set on the periphery of the spherical model 20. In this case, to sufficiently evaluate how the state of the gas flow is changed by the configuration and the like of a concavity 20b formed on the surface of the spherical model 20 and perform computations efficiently, the distance between the surface 20a of the spherical model 20 and the outer end of the spatial part 21 is set appropriately to 10–100 times as long as the depth of the concavity 20b.

The spatial part 21 is divided into blocks to form a large number of latticed divisions 22. The entire spherical surface 20c of the spherical model 20 is also divided into blocks to form a large number of latticed divisions 23. The latticed divisions 22 and 23 are formed as hexahedrons and are unstructured lattices. In supposition of a state in which the spherical model 20 is rotating on its rotational axis i, the latticed division 22 of the spatial part in the vicinity of the spherical model 20 and the latticed division 23 of the spherical surface 20c of the spherical model 20 are set as described later. Although the latticed division 22 is formed in the entire spatial part 21, and the latticed division 23 is formed on the entire spherical surface 20c of the spherical model 20, only a part of the spatial part 21 and the spherical surface 20c of the spherical model 20 are latticed on the convenience of indication in FIG. 8.

Figure 9:
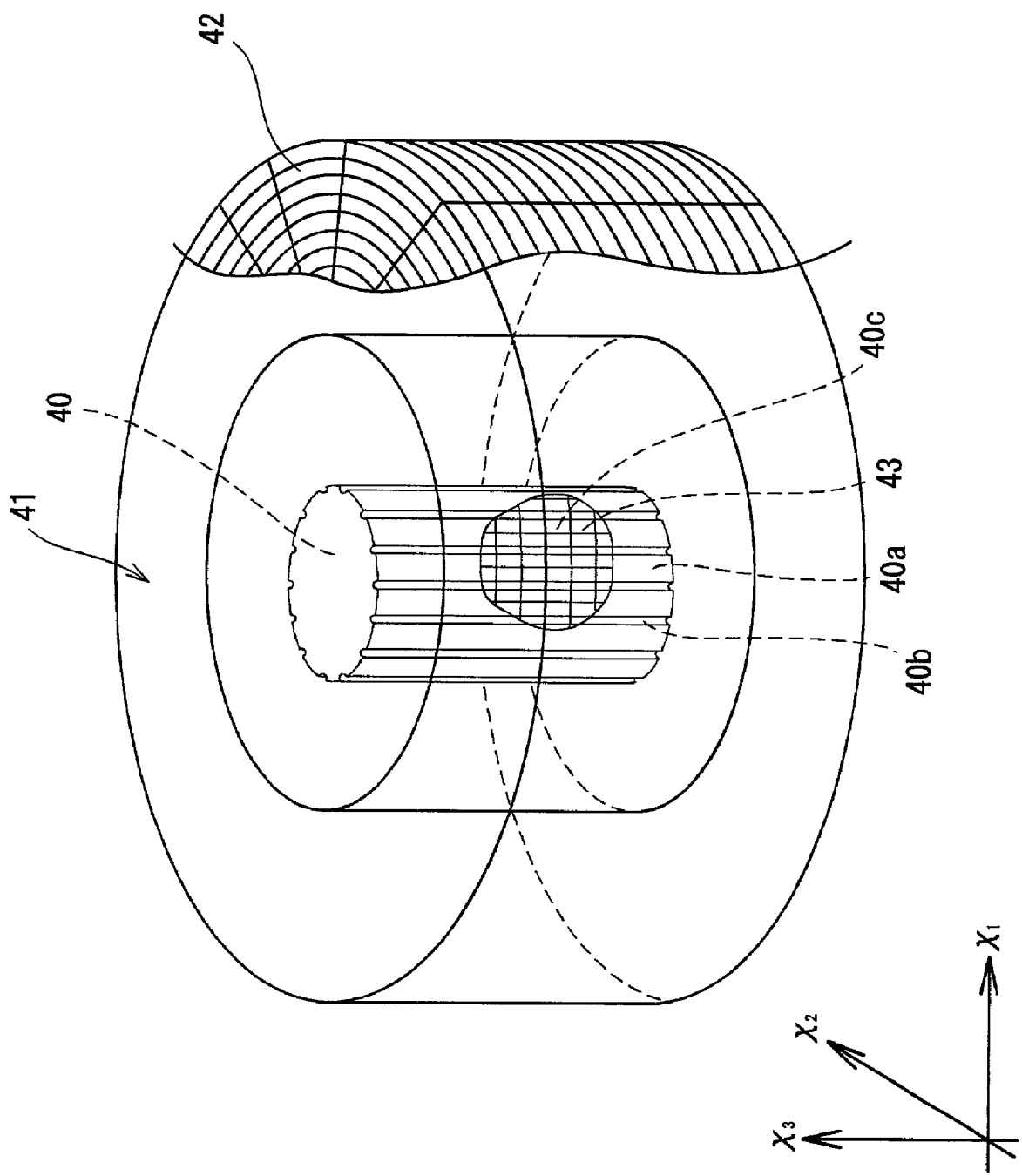
FIG. 9 is a schematic view showing the set state of the columnar model and the spatial part.

As in the case of the spherical model 20, as shown in FIG. 9, a spatial part 41 is set on the periphery of the columnar model 40. In this case, to sufficiently evaluate how the state of a gas flow is changed by the configuration and the like of the groove 40b formed on the circular surface 40a of the columnar model 40 and perform computations efficiently, the distance between the circular surface 40a of the columnar model 40 and the outer end of the spatial part 41 is set appropriately to 10–100 times as long as the depth of the groove 41.

The spatial part 41 is divided into blocks to form a large number of latticed divisions 42. The entire spherical surface 40c of the columnar model 40 is also divided into blocks to form a large number of latticed divisions 43. The latticed divisions 42 and 43 are formed as hexahedrons. In supposition of a state in which the columnar model 40 is rotating on its rotational axis i, the latticed division 42 of the spatial part in the vicinity of the columnar model 40 and the latticed division 43 of the spherical surface 40c of the columnar model 40 are set, as described later. Although the latticed divisions 42 and 43 are formed in the entire spatial part 41 and on the entire spherical surface 40c of the columnar model 40, only a part of the spatial part 41 and the spherical surface 40c of the columnar model 40 are latticed on the convenience of indication in FIG. 9.

Figure 10:
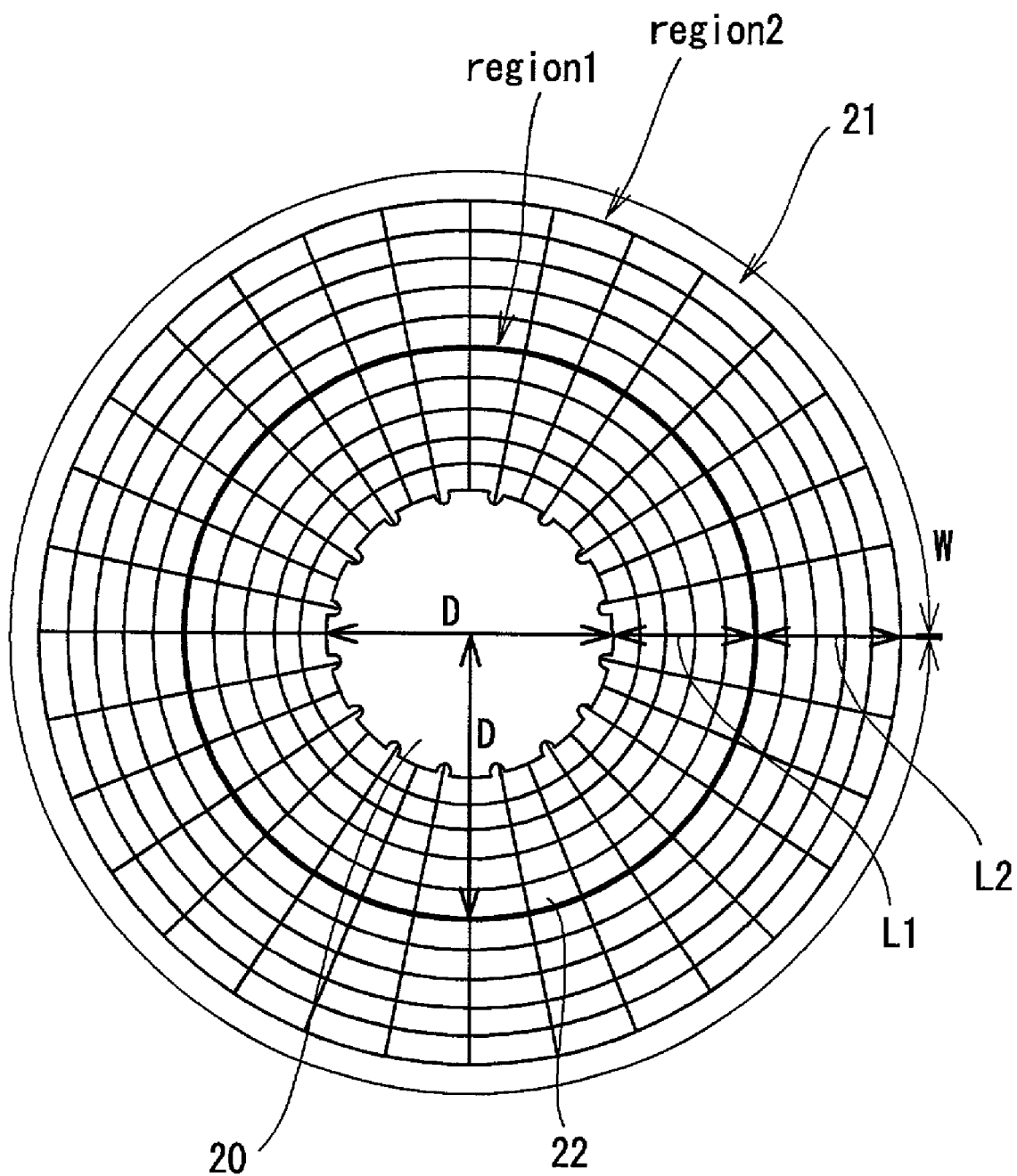
FIG. 10 is a schematic sectional view showing an $X_1X_2$ plane (plane passing through the center of the spherical model) of the spatial part containing the spherical model.

As shown in FIG. 10, the latticed division 22 of the spatial part 21 is divided into a region 1 including the spherical model 20 and a spatial region 2 disposed on the periphery of the region 1. The rotation of the region 1 indicates the rotation of the spherical model 20. In the gas flow in the vicinity of the interface between the two regions 1 and 2, physical amounts thereof such as the velocity and the pressure (inflow mass, momentum, and the like) thereof are computed by arithmetically interpolating the physical amounts by a secondary linear interpolation to transmit the gas flow from the region 1 to the region 2 and vice versa.

The region 1 is spherical to rotate it around the spherical model 20. The region 2 disposed on the periphery of the region 1 is also spherical in correspondence to the shape of the region 1.

Supposing that the diameter of a sectional circle of the spherical model 20 is D, the region 1 is a sphere coaxial with the sectional circle and having a radius 1D. The radius of the region 2 is so set that the distance between the center of the sectional circle of the spherical model 20 and the outward end of the region 2 is less than 20D.

In the simulation of the first embodiment, the number of nodal points constituting the latticed divisions is 1,179,300. The region 1 is divided into 81 meshes in its radial direction L1. The region 2 is divided into 100 meshes in its radial direction L2. Each of the regions 1 and 2 is divided into 362 meshes in the circumferential direction W thereof. The spherical model 20 is also divided into meshes. On the convenience of indication in FIG. 10, the number of lines is less than the actual number of meshes.

Figure 11A:
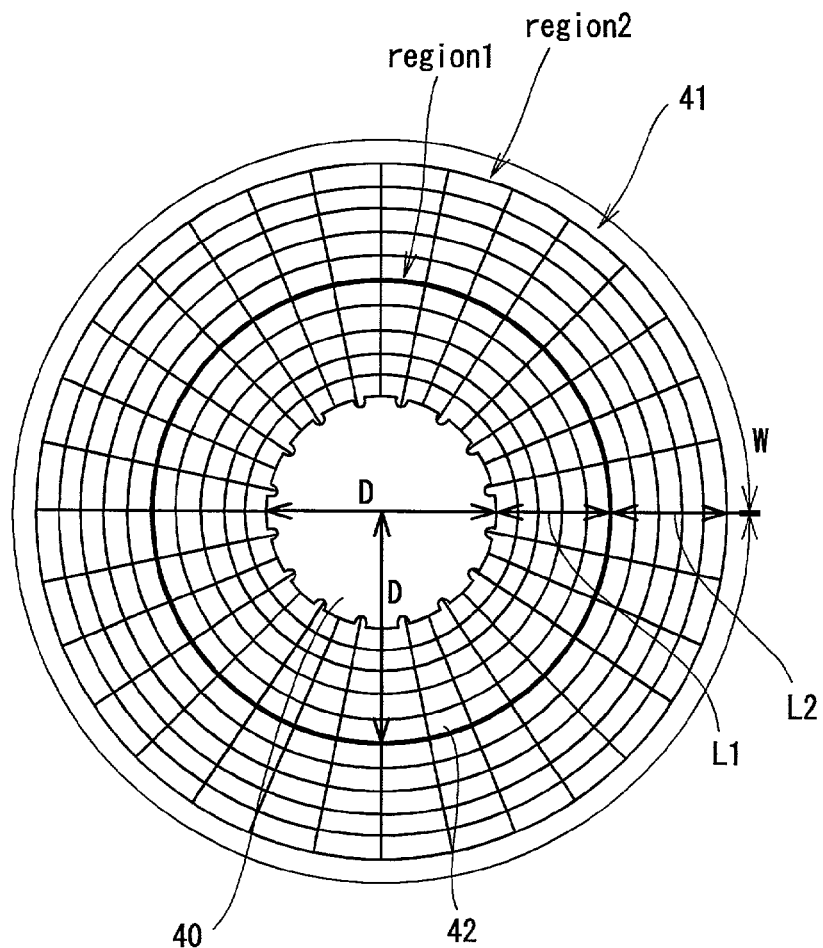
FIG. 11A is a sectional view showing an $X_1X_2$ plane of the spatial part containing the columnar model.
Figure 11B:
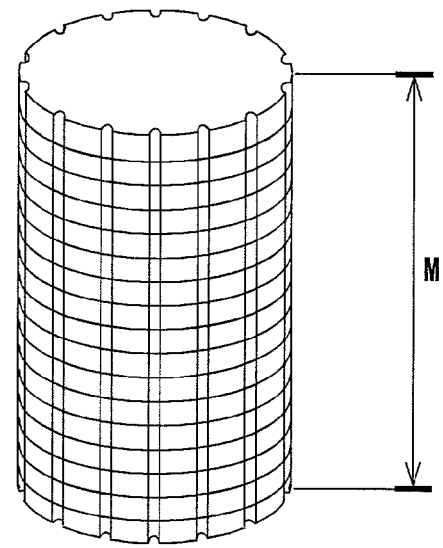
FIG. 11B shows the state of the surface of the columnar model.

As shown in FIGS. 11A and 11B, the latticed division 42 of the spatial part 41 is divided into a region 1 including the columnar model 40 and a spatial region 2 disposed on the periphery of the region 1. The rotation of the region 1 indicates the rotation of the columnar model 40. In the flow of the gas in the vicinity of the interface between the two regions 1 and 2, physical amounts thereof such as a velocity and a pressure (inflow mass, momentum, and the like) are computed by interpolating the physical amounts by a secondary linear interpolation to transmit the gas flow from the region 1 to the region 2 and vice versa.

The sectional configuration of the region 1 is circular to rotate it around the columnar model 40. The region 2 disposed on the periphery of the region 1 is also circular in correspondence to the shape of the region 1.

Supposing that the diameter of a circle disposed at the bottom surface of the columnar model 40 is D, the region 1 is a circle coaxial with the circle at the bottom surface of the columnar model 40 and having a radius 1D. The radius of the region 2 is so set that the distance between the center of the sectional circle at the bottom surface of the columnar model 40 and the outward end of the region 2 is less than 20D.

In the simulation of the second embodiment, the number of nodal points constituting the latticed divisions is 362,400 (302×100×12). The region 1 is divided into 45 meshes in its radial direction L1. The region 2 is divided into 55 meshes in its radial direction L2. Each of the regions 1 and 2 is divided into 302 meshes in the circumferential direction W thereof. The spherical model 20 is also divided into 12 meshes in its height direction. On the convenience of indication in FIG. 10, the number of lines is less than the actual number of meshes.

Figure 12:
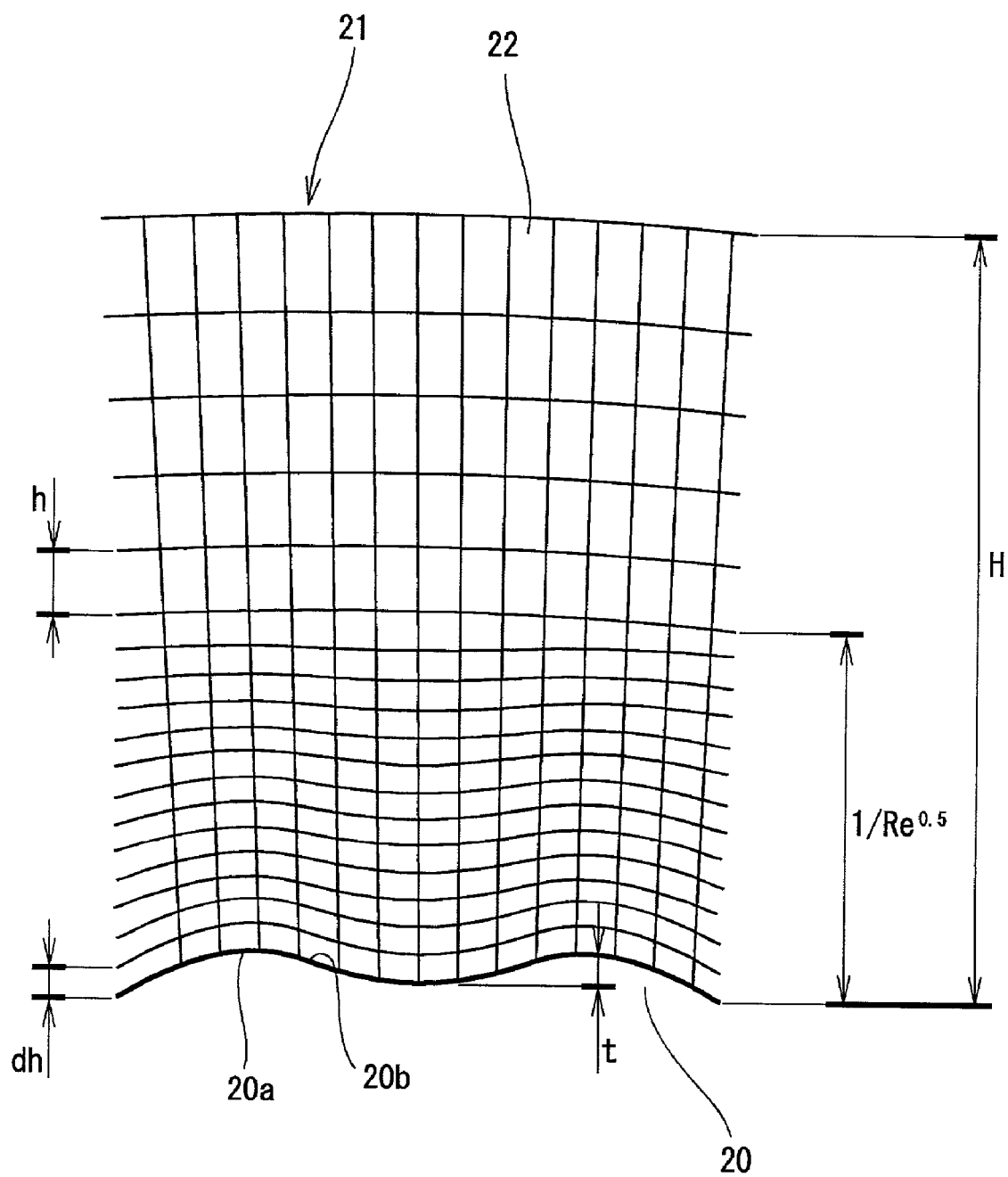
FIG. 12 is a schematic view showing latticed divisions of the spatial part.

The size of the latticed division 22 dividing the spatial part 21 can be variably set. For example, the size of a part of each latticed division 22 can be variably set. Referring to FIG. 12, the neighborhood of the surface 20a of the spherical model 20 having the concavity 20b whose depth is t is the boundary layer. Considering that the gas flow changes in a high extent in the neighborhood of the surface 20a of the spherical model 20 and that the gas flow changes in a low extent in the portion over the surface 20a, the thickness of the latticed division 22 is divided finely in the vicinity of the surface 20a of the spherical model 20 and becomes gradually large toward the periphery of the spatial part 21.

More specifically, in the first embodiment, the thickness dh of each latticed division 22 located outward in a range less than $1/Re^{0.5}$ (Re is Reynolds number, Re=representative velocity×representative length/kinematic viscosity of gas) with respect to the surface 22a of the spherical model 20 is uniformly set to improve computing accuracy. The thickness h of each latticed division 22 located outward in a range not less than $1/Re^{0.5}$ with respect to the surface 20a of the spherical model 20 is set to not less than $1/Re^{0.5}$ in such a way that the thickness h becomes gradually larger toward the periphery of the spatial part 21 to have improved computing accuracy and shorten a computing period of time. In the equation Re=representative velocity×representative length/kinematic viscosity of gas, the representative velocity is the flight velocity of a ball, and the representative length is the diameter thereof.

The thickness dh of each latticed division 22 located outward in a range less than $1/Re^{0.5}$ with respect to the surface 22a of the spherical model 20 may be set in such a way that the thickness dh becomes gradually larger to the periphery of the spatial part 21 in the range of not less than $1/(1000 \cdot Re^{0.5})$ nor more than $1/Re^{0.5}$.

Figure 13:
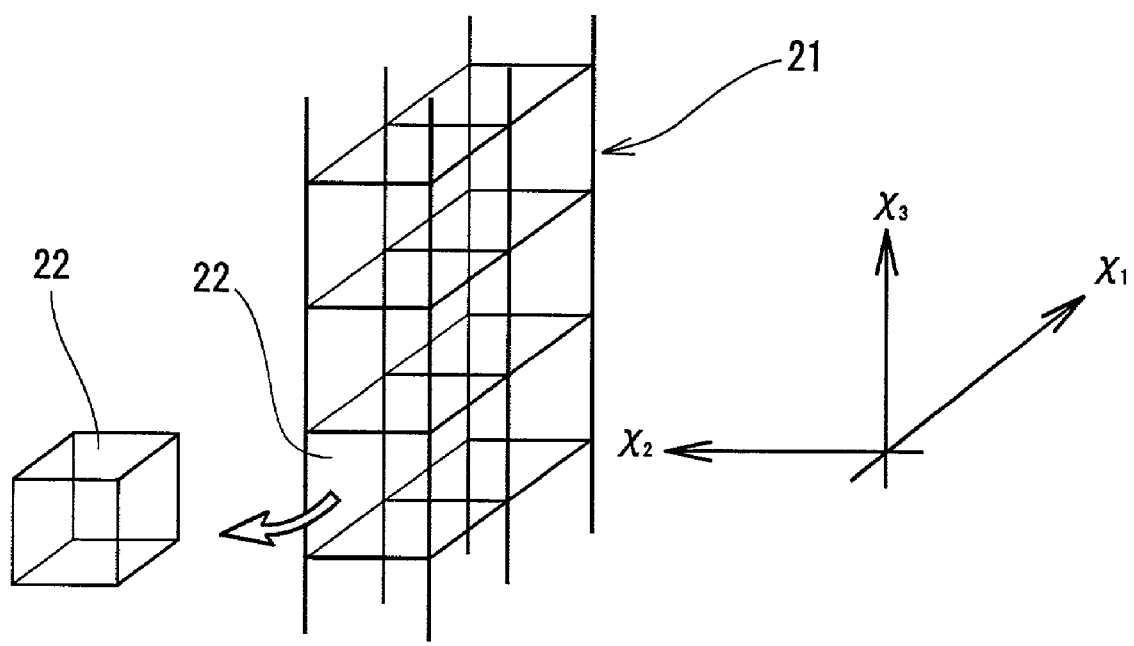
FIG. 13 shows main portions of the latticed divisions of the spatial part in detail.

As shown in FIG. 13, each of the latticed divisions 22 and 42 is formed as a hexahedron. To specify the position of each of the latticed divisions 22 and 42, the direction in the spatial part 21 and 41 is specified as described below: The direction of the spatial part vertical to the surface 20a of the spherical model 20 and coincident with a fluid-flowing direction which will be described later is denoted as a direction $x_1$, the direction orthogonal to the direction $x_1$ and disposed on the plane on which the direction $x_1$ is disposed is denoted as a direction $x_2$, and the direction vertical (direction of the rotational axis i of the spherical model 20) to the plane formed with the directions $x_1$ and $x_2$ is denoted as a direction $x_3$. The direction of the spatial part vertical to the spherical surface 40a of the columnar model 40 and coincident with a fluid-flowing direction which will be described later is denoted as a direction $x_1$, the direction orthogonal to the direction $x_1$ and forming the same plane with the direction $x_1$ is denoted as a direction $x_2$, and the direction vertical (direction of the rotational axis i of the columnar model 40) to the plane formed with the directions $x_1$ and $x_2$ is denoted as a direction $x_3$.

As in the case of the first embodiment, in the second embodiment, the thickness of each of the latticed divisions 42 and 43 is set in the direction outward from the circular surface 40a of the columnar model 40.

Figure 14:
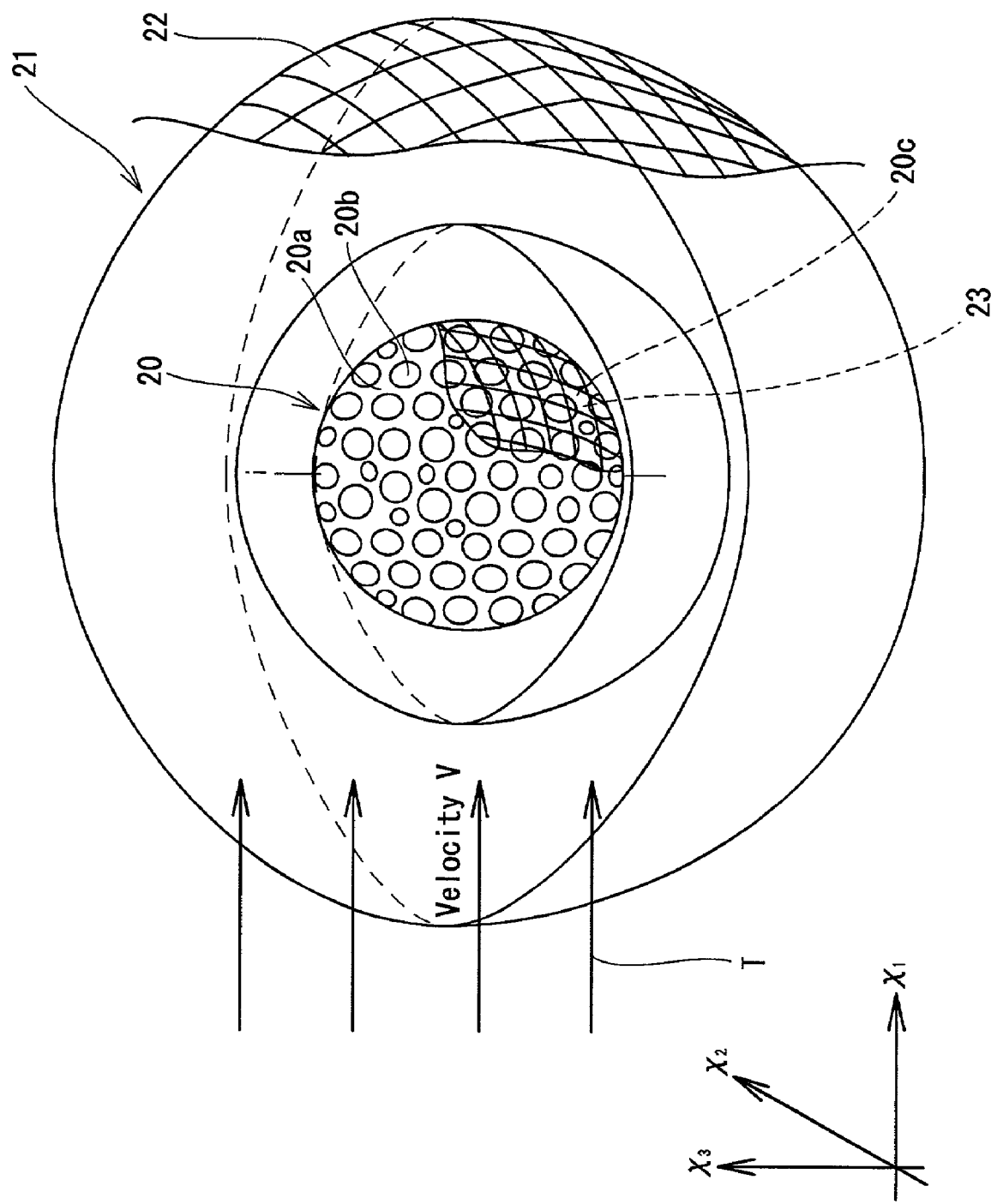
FIG. 14 is a schematic view showing the situation of a gas flow in the spatial part.

After the spatial part 21 and the latticed division 22 are modeled as described above, according to the simulation program, as shown in FIG. 14, a gas (air) T flows through the spatial part 21 in the direction shown with the arrows by introducing the gas T in the direction from one surface 21a of the spatial part 21 to the surface 20a of the spherical model 20 and passing it along the surface 20a of the spherical model 20.

Figure 15:
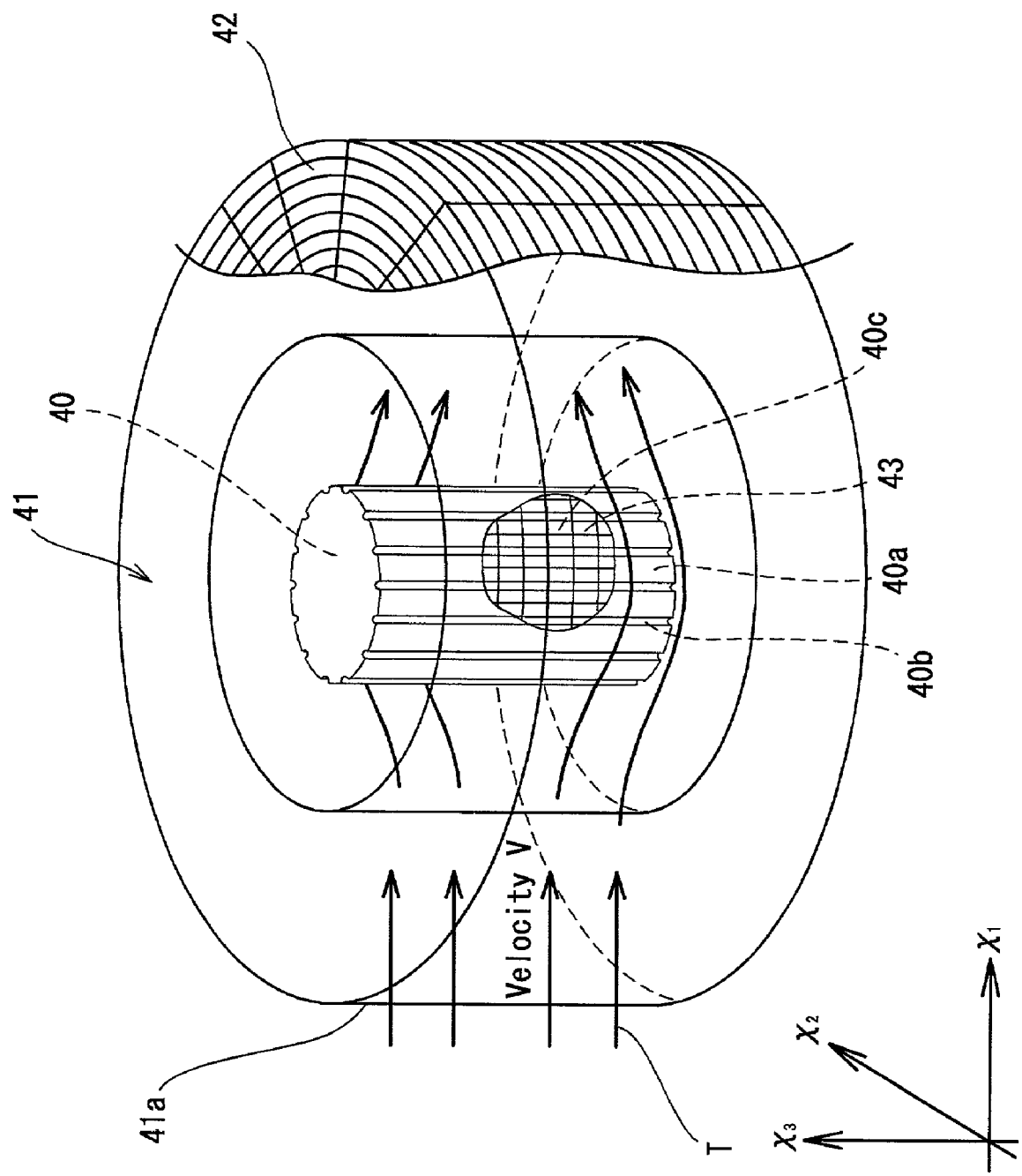
FIG. 15 is a schematic view showing the situation of the gas flow in the spatial part.

After the spatial part 41 and the latticed division 42 are modeled as described above, according to the simulation program, as shown in FIG. 15, a gas (air) T flows through the spatial part 21 in the direction shown with the arrows by introducing the gas T in the direction from a spherical surface 41a of the spatial part 41 to the circular surface 40a of the columnar model 40 and passing it along the entire surface of the columnar model 40.

The motion regarding the flow of the gas T is expressed by the equation of continuity (1) equivalent to the law of conservation of mass of the motion of an object and the Navier-Stokes equation (2) equivalent to the law of conservation of momentum of the motion of the object. The equations (1) and (2) are shown below. In the simulation, in consideration of a relative velocity, a state in which the spherical model or the columnar model is flying in rotation at a velocity V is regarded as a state in which gas having a velocity V passes the spherical model or the columnar model rotating at a certain position.

In the case where compressibility of gas is considered, it is necessary to consider an equation (α) regarding the principle of the conservation of energy in addition to the equations (1) and (2).

[Equation 1]

$$\frac{\partial \rho}{\partial t} + \frac{\partial}{\partial x_i}(\rho v_i) = 0 \quad (1)$$

$$\frac{\partial}{\partial t}(\rho v_i) + \frac{\partial}{\partial x_j}(\rho v_i v_j) = \frac{\partial}{\partial x_j}P_{ij} + \rho K_i \quad (2)$$

$$\frac{\partial \rho E_t}{\partial t} + \frac{\partial}{\partial x_j}(\rho E_t v_j) = \frac{\partial}{\partial x_j}(v_i P_{ij} - \Theta_j) + \rho v_i K_i + \rho Q \quad (\alpha)$$

In the equations (1) and (2) expressed in a tensor form respectively, ρ is the density of a gas, v is its velocity, K is an external force applied to a unit mass of the gas, P is a stress tensor applied to the gas, t is a time, Et is an entire energy per mass, Θ is a heat flow vector, Q is a calorific value per mass, V is a volume, and S is an area. A gravitational force and a buoyancy correspond to the external force K. A pressure applied to the surface of an object and a shearing component correspond to the stress tensor P. $P_{ij}$(i,j=1, 2, 3) can be expressed in terms of a matrix having three rows and three columns (equation (3)), namely, nine numbers in a three-dimensional space coordinate system of $x_1$, $x_2$, and $x_3$.

$$\begin{matrix} P11 & P12 & P13 \\ P21 & P22 & P23 \\ P31 & P32 & P33 \end{matrix} \quad (3)$$

In the simulation in which the gas T successively flows on the periphery of the spherical model 20 or the columnar model 40, an gas flow is analyzed by a computation for each latticed division of the spatial part. The equations (1) and (2) are used for the computation. The computation is performed by making the equations (1) and (2) discrete from each other in correspondence to the partition of the spatial part into the latticed divisions. The simulation method is carried out by the finite difference method, the finite volume method, the boundary element method or the finite element method appropriately selected in consideration of the condition of the simulation.

In the case where the finite difference method is used to perform the computation by using the discrete two equations, the computation is made sequentially at each slight time dt and each of intersection points of the latticed divisions to find the motion element of the gas flow, namely, the velocity of the gas, its flow direction, and the pressure of the gas applied to an object surface at a particular time. By combining results of the computation for the intersection points with each other, it is possible to express the motion of the gas flow in the entire spatial part in terms of numerical values. Thereafter computations similar to that described above are performed at each slight time dt to express the motion of the gas flow in each time zone in terms of numerical values. In addition to performing the computation for each of the intersection points of the latticed divisions, the computation may be performed for the center of each latticed division or the surface of the lattice thereof.

Each numerical value regarding the motion of the gas flow obtained in the above-described manner is displayed visually by using a special-purpose or general-purpose visualizing software to determine the result of the simulation. In the visualization, only the direction and magnitude of the velocity are shown by a vector to display the velocity of the gas on the surface and on the periphery of the object or a pressure distribution is shown by an isobaric line or an isobaric surface connecting equal pressures applied to the object surface to each other to visually display various elements of the gas flow. How the configuration and the like of the surface or the like of the imaginary object model affects the gas flow on the periphery of thereof is visualized in this manner to allow the visualization to be serviceable for the designing of the configuration and the like of the surface thereof. In the embodiment, to visualize the motion of the gas, the flow situation thereof is visualized on the basis of numerical values obtained by computations, by using a visualizing software (FIELD VIEW: manufactured by Intelligent Light Inc. of U.S.) which is commercially available.

Figure 16:
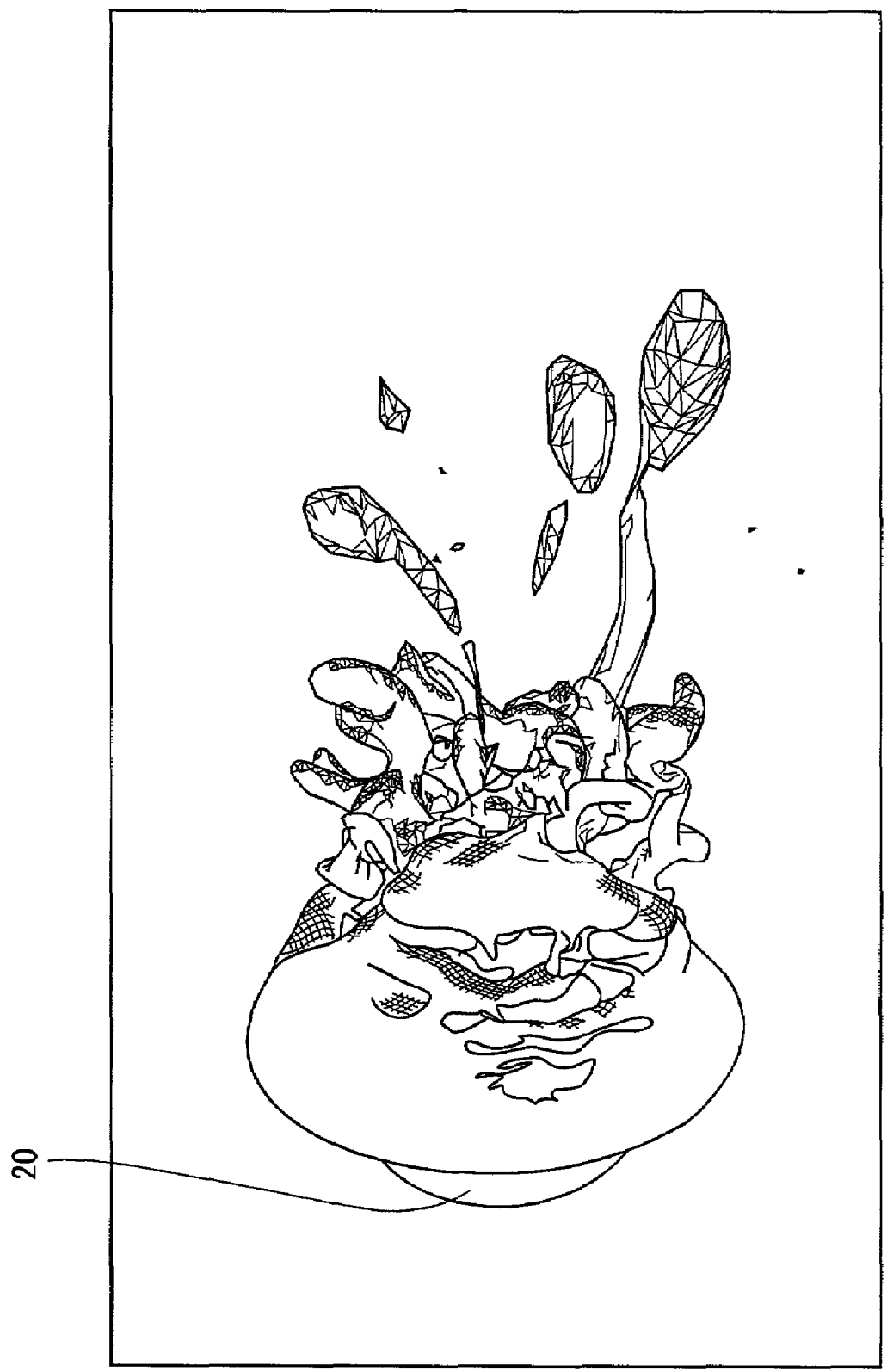
FIG. 16 shows a vorticity distribution situation of an eddy flow on the periphery of the spherical model and a pressure distribution on the surface of the spherical model.

More specifically, FIG. 16 shows the distribution situation of the vorticity of an eddy flow on the periphery of the spherical model 20 at a certain time with an equal-value surface of the vorticity and also the pressure distribution on the surface of the spherical model 20. By using the visualizing software in this manner, it is possible to confirm not only a generation of a narrow eddy flow at the downstream side of the spherical model 20 but also a state in which the eddy flow separates from the spherical model 20.

Figure 17:
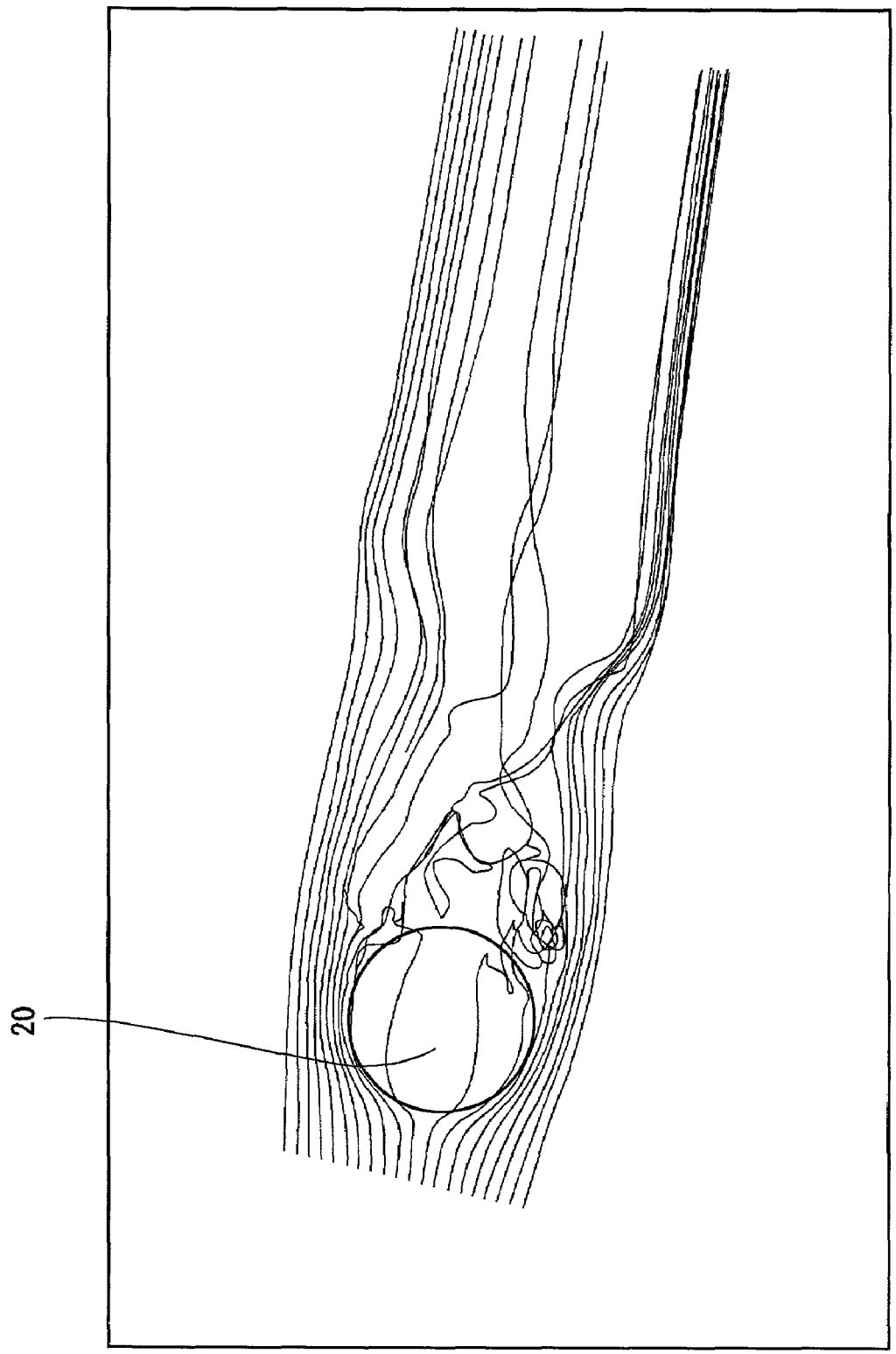
FIG. 17 shows the state of an gas flow on the periphery of the spherical model by using stream lines.
Figure 18:
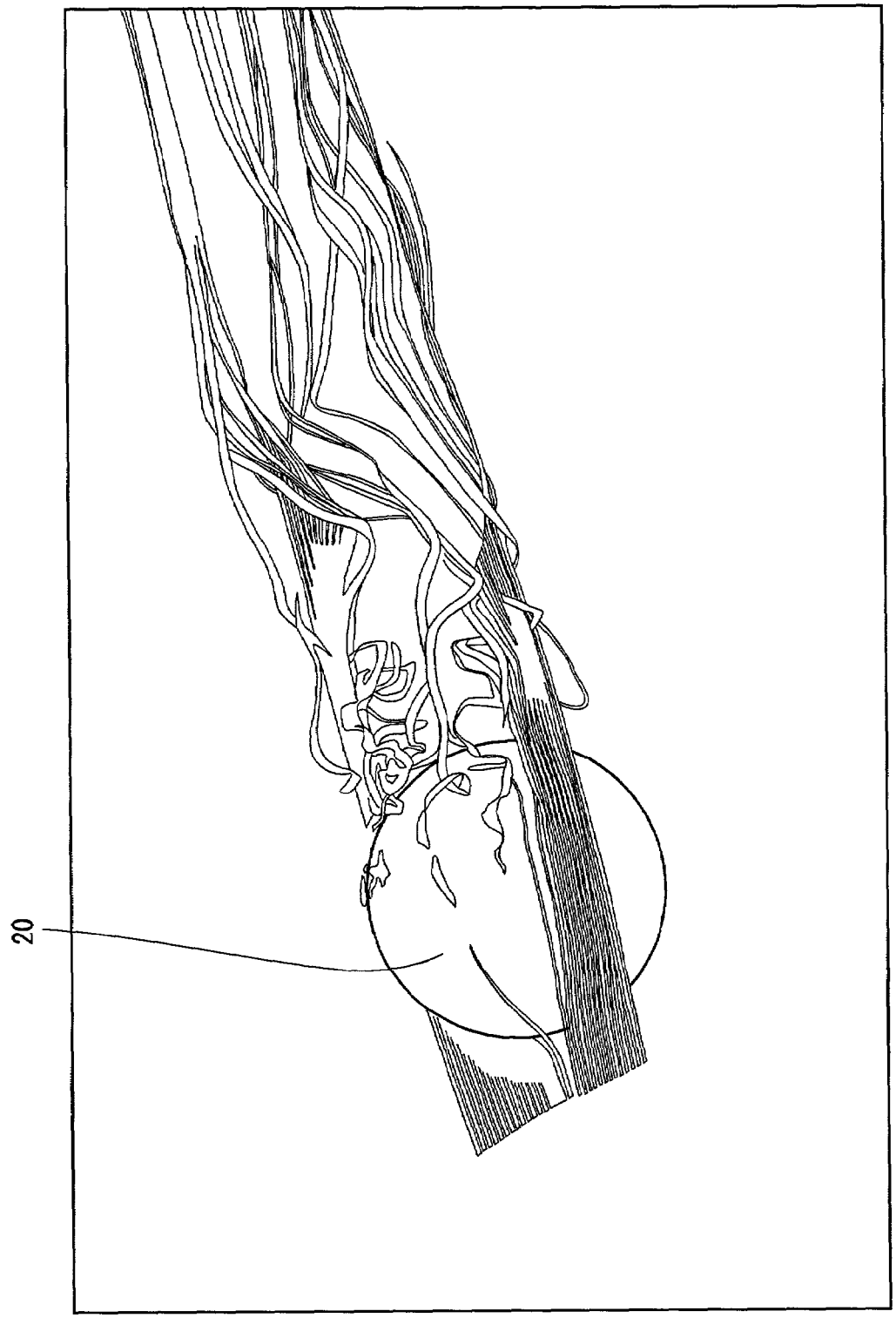
FIG. 18 shows the state of the gas flow on the periphery of the spherical model and the pressure distribution on the surface of the spherical model.

FIGS. 17 and 18 show the state of an gas flow on the periphery of the spherical model 20 at a certain time by using a line of stream (flow velocity). FIGS. 17 and 18 indicate that the gas flow is complicated immediately after it passes a ball.

Figure 19:
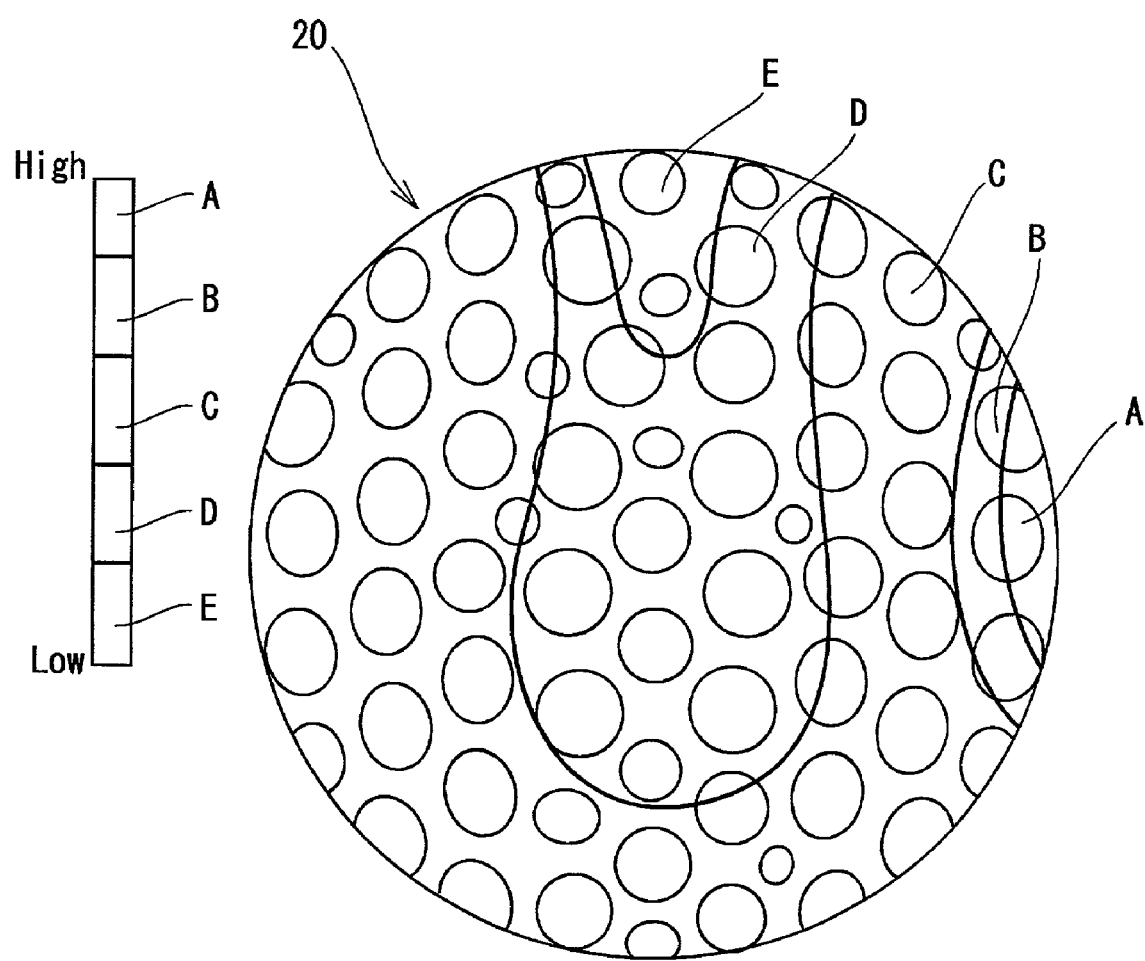
FIG. 19 shows the pressure distribution on the surface of the spherical model.

FIG. 19 shows the distribution of the pressure of the gas applied to the surface of the spherical model 20. It can be confirmed from FIG. 19 that there is a distribution in the pressure even in one concavity. More specifically, the pressure distribution is visualized by classifying the surface of the ball by color in dependence on the situation of the pressure distribution. With reference to FIG. 19, on the surface of the spherical model 20 (pressure distribution: region indicated with A has highest pressure and region indicated with E has lowest pressure), the pressure at the upper portion thereof in FIG. 19 is lower than that at the lower portion thereof (upper portion has many low-pressure regions E). By visualizing the pressure distribution in this manner, it can be confirmed that a lift is generated.

Figure 20:
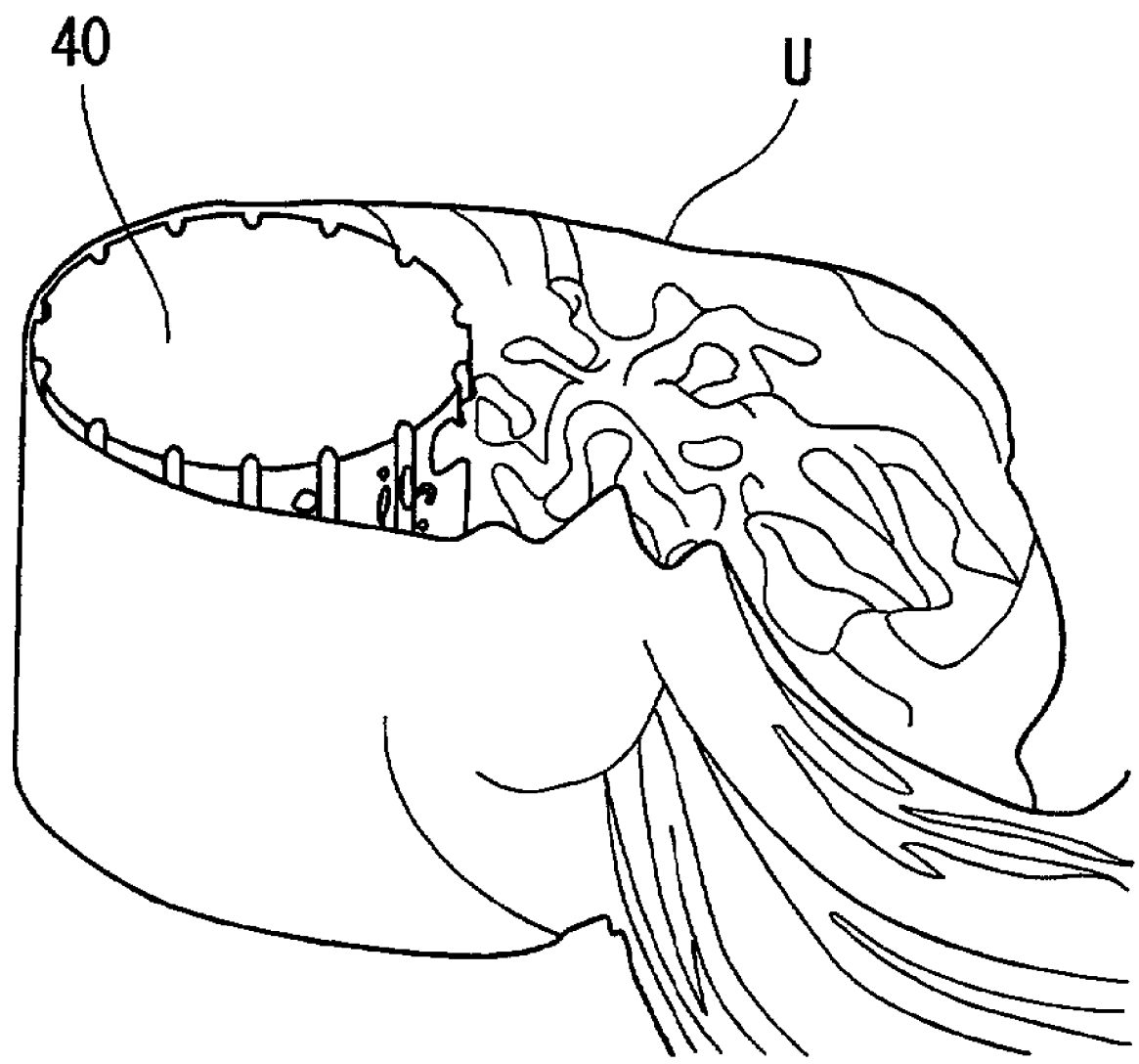
FIG. 20 is shows an eddy flow of the gas on the periphery of the columnar model.

FIG. 20 shows the vorticity distribution situation of an eddy flow on the periphery of the columnar model 40 at a certain time with an equal-value surface U of the vorticity. From FIG. 20, it is possible to confirm not only a generation of a long and narrow eddy flow at the downstream side of the columnar model 40 but also the size and shape of the eddy flow.

Figure 21:
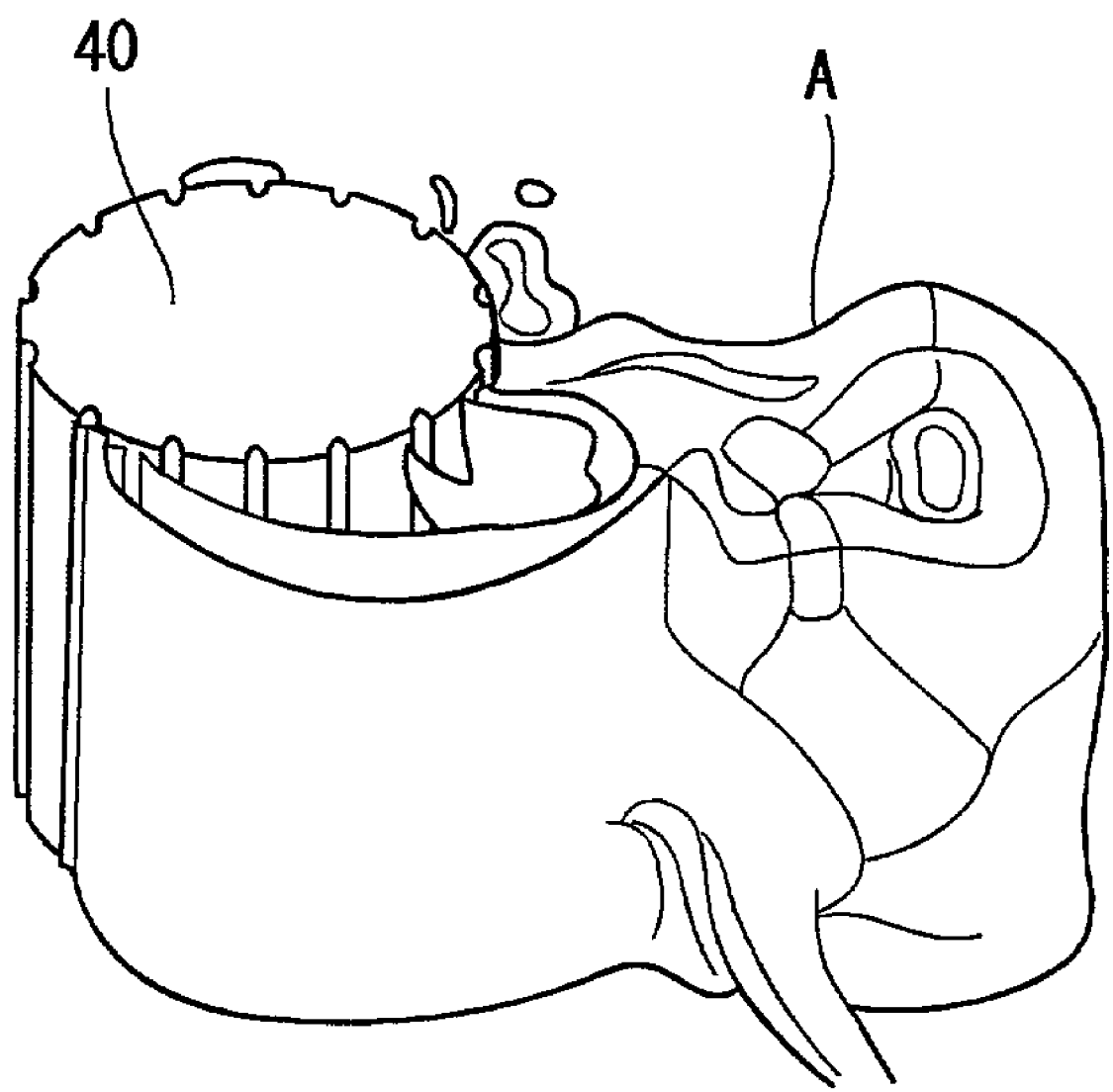
FIG. 21 shows an isobaric distribution of the gas on the periphery of the columnar model.

FIG. 21 shows the distribution situation of the pressure of an gas T on the periphery of the columnar model 40 visually at a certain time with a section A formed by connecting uniform-pressure portions to one another with a line. From FIG. 21, it is possible to confirm that the pressure changes centered at the downstream side of the columnar model 40 and that the interval between the isobaric lines is small and thus the pressure change is large at the downstream side of the columnar model 40.

The vorticity distribution and the pressure distribution may be visualized with a vorticity isopleth and a pressure vorticity respectively. In addition, based on computed results, the flow velocity, flow direction, stream line, trajectory, and particle trace of the gas T can be visualized with a line or classification by coloring. The flow direction of the gas T is made coincident with the velocity direction obtained by the computation of synthesizing the components of each of the three-dimensional rectangular coordinates.

Using the simulation method of the present invention, it is possible to analyze an gas flow on the periphery of the spherical model when the spherical model having the concavity formed thereon is rotating on its axis and also analyze the gas flow on the periphery of the columnar model when the columnar model having the groove formed thereon is rotating on its axis.

Thus the simulation method of the present invention allows evaluation of the situation of the gas flow on the periphery of the rotating spherical model and columnar model. Therefore it is possible to apprehend the situation of the gas flow on the periphery of the sphere such as the dimple-provided golf ball which rotates when it flies and determine how the concavity such as the dimple and the rotation of the sphere affect the situation of the gas flow.

Figure 22:
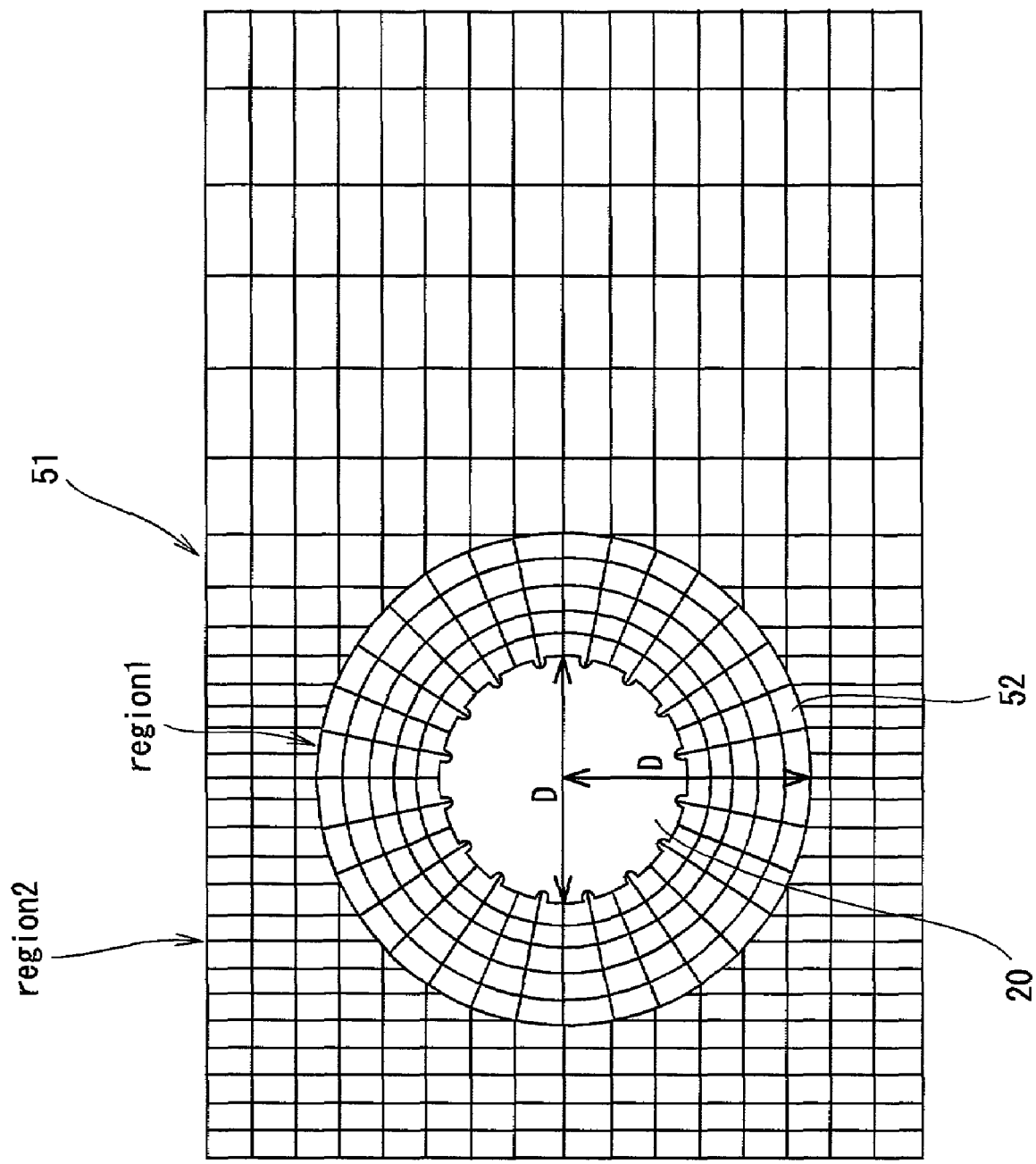
FIG. 22 is a sectional view showing a modification of the set state of a spatial part containing the spherical model.
Figure 23:
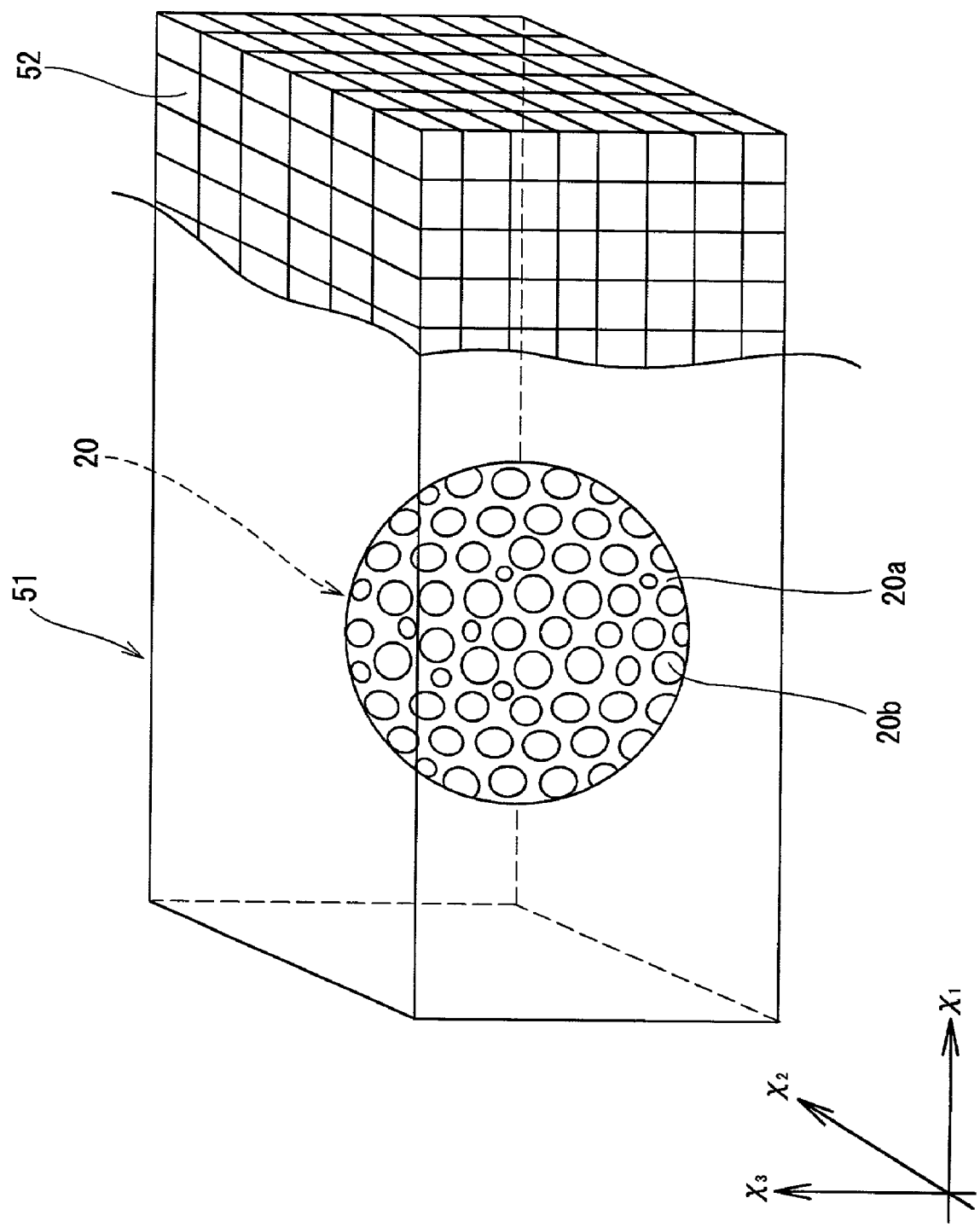
FIG. 23 is a schematic view showing a modification of the set state of the spherical model and the spatial part.

In the first embodiment, the sectional shape of each of the regions 1 and 2 is spherical. As shown in FIGS. 22 and 23, in setting the latticed division 52 of the spatial part 51, the region 1 may be spherical to rotate it around the spherical model 20, the region 2 disposed on the periphery of the spherical model 20 may be a rectangular solid to make the spherical model stationary, and the region of the latticed division 52 may be set widely to analyze turbulence and behavior of the gas flow which has passed the surface of the spherical model 20 at the downstream side thereof.

Figure 24:
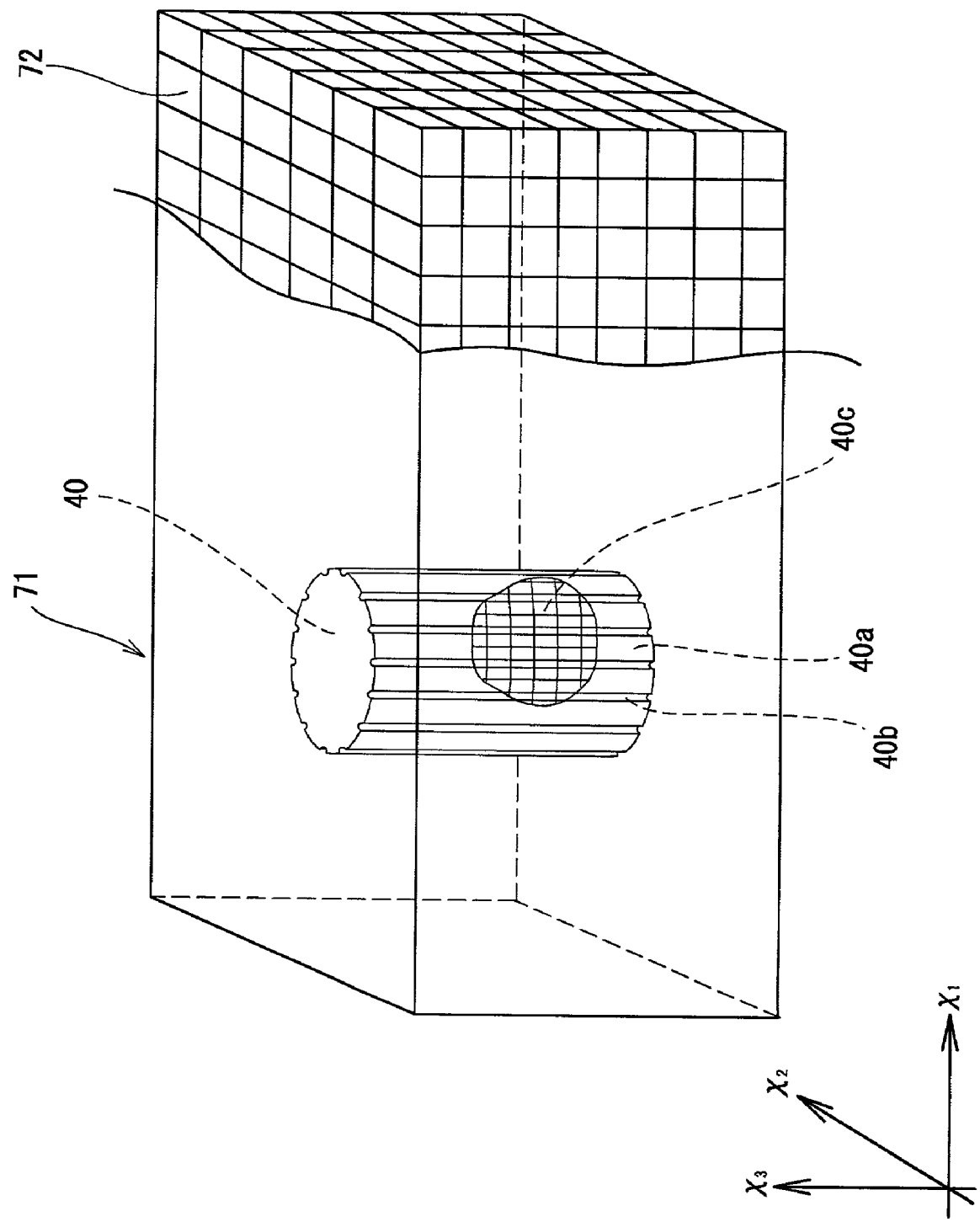
FIG. 24 is a schematic view showing a modification of the set state of the columnar model and the spatial part.

In the second embodiment, the sectional configuration (sectional configuration vertical to axis) of each of the regions 1 and 2 is circular. As shown in FIG. 24, in setting the latticed division 72 of the spatial part 71, the region 1 may be circular to rotate it around the columnar model 40, the region 2 disposed on the periphery of the columnar model 40 may be quadrilateral to make the columnar model 40 stationary, and the region of the latticed division 72 may be set widely to analyze turbulence and behavior of the gas flow which has passed the surface of the columnar model 40 at the downstream side thereof.

Figure 25A:
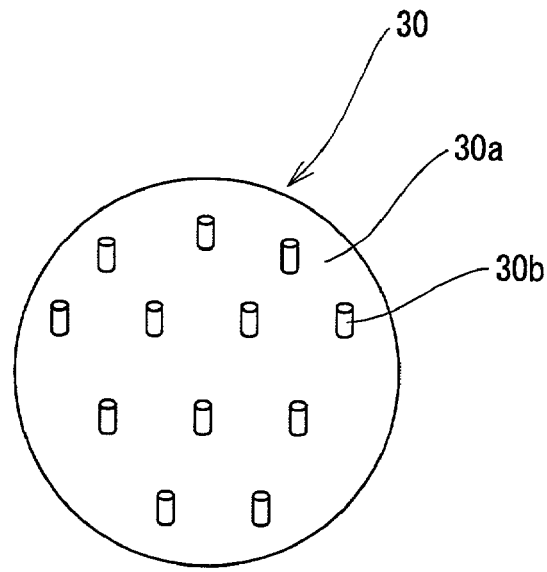
FIGS. 25A, 25B, and 25C are schematic views each showing a modification of the configuration of the spherical model.
Figure 25B:
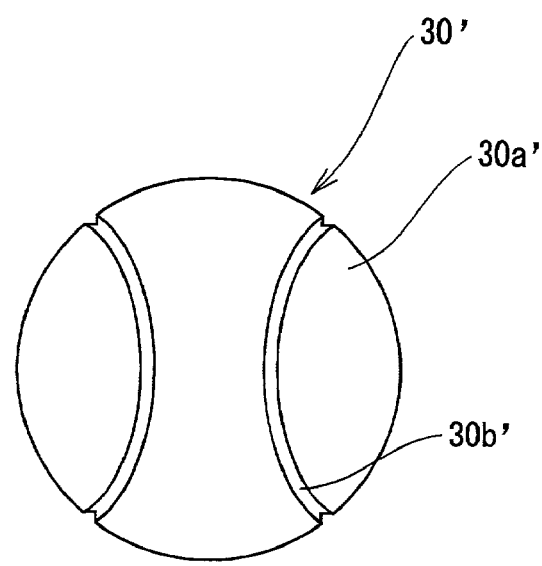
Figure 25C:
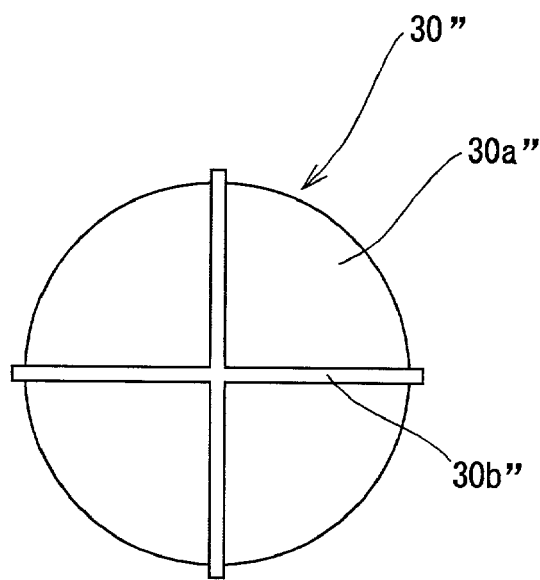

In the first embodiment, the concavity 20*b* is formed on the entire surface 20*a* of the spherical model 20. But instead of the concavity 20*b*, as shown in FIG. 25A, a convexity 30*b* may be formed on the entire surface 30*a* of a spherical model 30 which is simulated. As shown in FIG. 25B, a spherical model 30' which is simulated may be set by forming a groove 30*b*' on a surface 30*a*' of a spherical model 30'. Further as shown in FIG. 25C, a projection 30*b*" may be formed on a surface 30*a*" of a spherical model 30". The disposition of the concavities or grooves formed on the surface of the spherical model and the number thereof are not limited to a specific number nor the number of the concavities and the grooves is limited to a specific number when they are combined with each other, but are selected as desired in dependence on a content to be analyzed by the simulation.

Figure 26A:
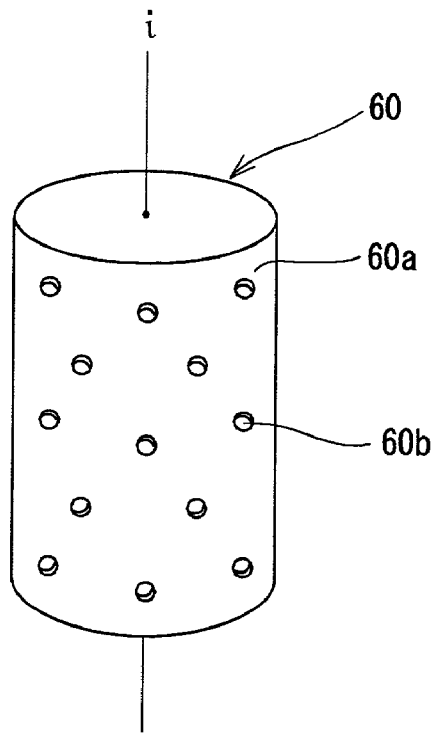
FIGS. 26A, 26B, and 26C are schematic views each showing a modification of the configuration of the columnar model.
Figure 26B:
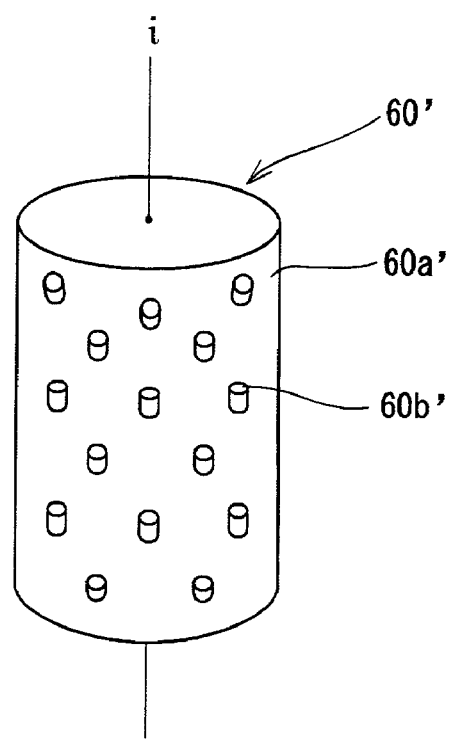
Figure 26C:
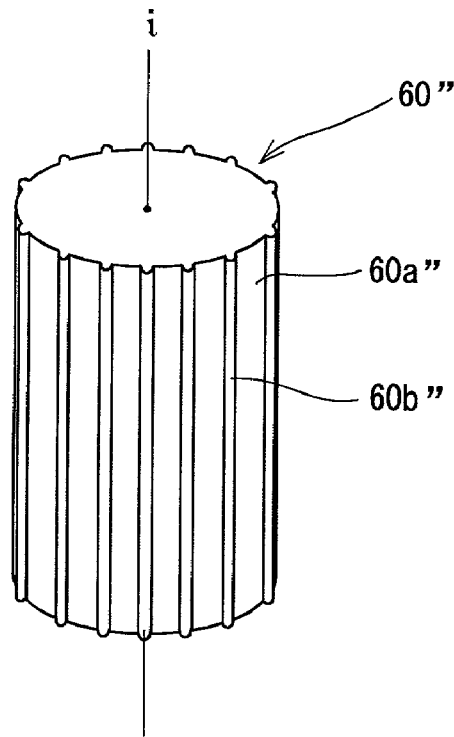
Figure 30:
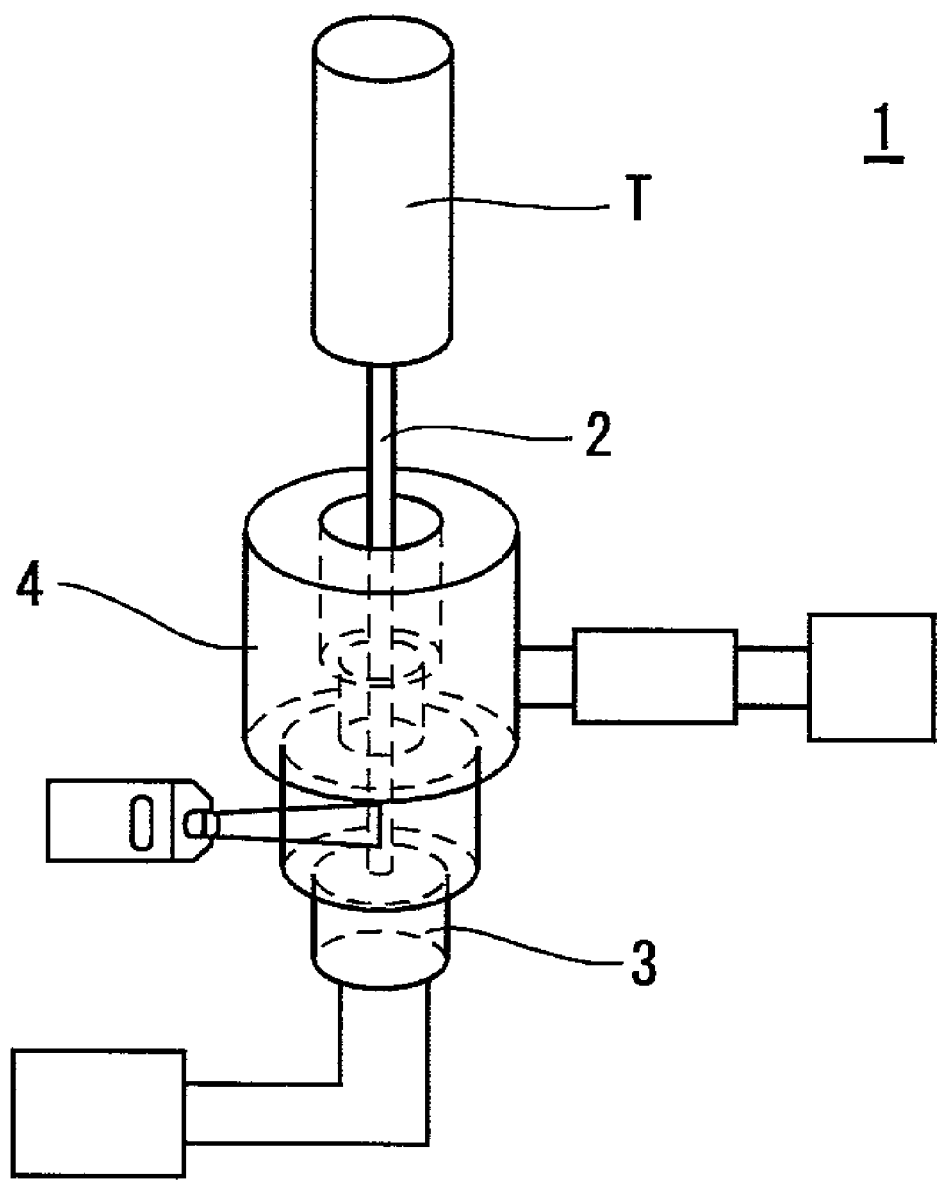
FIG. 30 is a schematic view showing a conventional measuring apparatus.

In the second embodiment, 30 grooves 40*b* are formed on the entire circular surface 40*a* of the columnar model 40 at regular intervals and parallel with the axis i of the columnar model 40. But instead of the groove 40*b*, as shown in FIG. 26A, a columnar model 60 which is simulated may be set by forming concavities 60*b* at regular intervals on the entire circular surface 60*a* of the columnar model 60. Further as shown in FIG. 26B, a columnar model 60' which is simulated may be set by forming convexities 60*b*' at regular intervals on the entire circular surface 60*a*' of the columnar model 60'. Furthermore as shown in FIG. 26C, 30 projections 60*b*" are formed on the entire circular surface 60*a*" of a columnar model 60" at regular intervals and parallel with the axis i of the columnar model 60". The disposition of the concavities or grooves formed on the surface of the spherical model and the number thereof are not limited to a specific number nor the number of the concavities and the grooves is limited to a specific number when they are combined with each other, but are selected as desired in dependence on a content to be analyzed by the simulation.

The above-described gas flow simulation method can be modified in various forms in conformity to the condition or the like of a simulation. For example, the equations (1) and (2) expressing the gas flow may be applicable in the form of integration equations (4) and (5), as shown below. In the case where compressibility of a gas is considered, it is necessary to consider an equation ($\beta$) regarding the principle of the conservation of energy in addition to the equations (4) and (5). In the case where a turbulent model is used as a gas flow, in the equations (1), (2), (4), and (5), it is possible to perform a computation by using the sum of an average velocity v' of the gas and a turbulent velocity v" of a turbulent component as a velocity component.

[equation 2]

$$\int\int\int_y \left(\frac{\partial \rho}{\partial t} + \frac{\partial}{\partial x_i}(\rho v_i)\right) dV = 0 \tag{4}$$

$$\int\int\int_v \left(\frac{\partial}{\partial t}(\rho v_i) + \frac{\partial}{\partial x_j}(\rho v_i v_j) - \frac{\partial}{\partial x_j} P_{ij} - \rho K_i\right) dV = 0 \tag{5}$$

$$\frac{\partial}{\partial t}\int\int\int_V \rho E_t dV = \tag{$\beta$}$$

$$\int\int_S (v_i P_{ij} - \rho E_t v_j - \Theta_j) n_j dS + \int\int\int_V (\rho v_i K_i + \rho Q) dV$$

The velocity of the gas flow along the surface of the imaginary object model is the boundary condition of the gas flow and is set to zero, supposing that normally, the gas does not slip on the surface of the imaginary object model. But a computation can be performed not by setting the velocity of the gas flow along the surface of the imaginary object model to zero, but by setting a component tangential to the surface of the imaginary object model rotating at a certain velocity as the velocity of the gas flow along the surface thereof. That is, the computation may be performed by using the addition of the velocity v of the gas and a rotational velocity component v" of the surface of the imaginary object model as the velocity component in consideration of the rotational velocity component v".

Figure 27A:
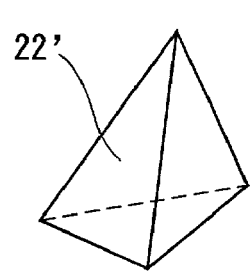
FIGS. 27A, 27B, and 27C are schematic views each showing a modification of the configuration of the latticed division.
Figure 27B:
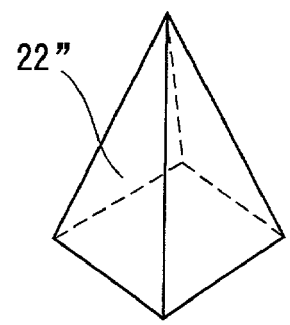
Figure 27C:
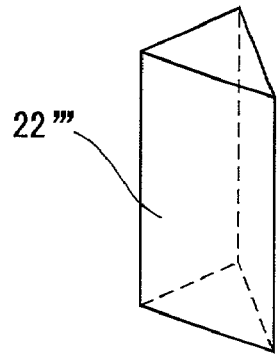
Figure 27D:
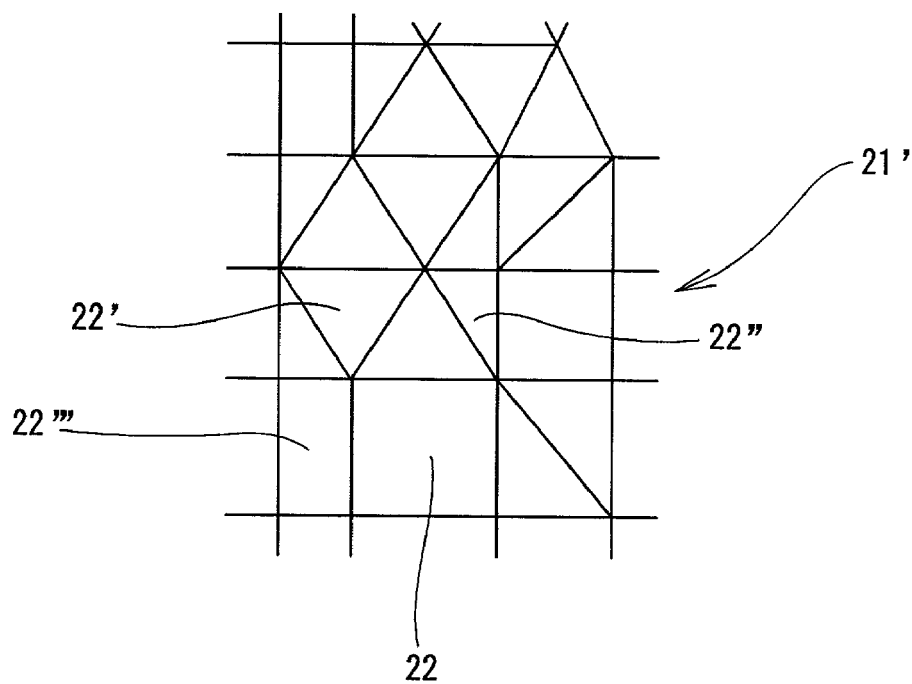
FIG. 27D is schematic view showing a modification of division of the spatial part.

In addition to a hexahedron, the latticed division 22 can be shaped as a trigonal pyramid, a quadrangular pyramid, a trigonal prism as shown by 22', 22", and 22''' in FIGS. 27A, 27B, and 27C respectively. Further a spatial part 21' can be divided by combining these configurations with each other, as shown in FIG. 27D. How to divide the spatial part into lattices with many configurations is appropriately determined in consideration of the configuration and condition of an object which is simulated.

In addition to setting the inflow velocity of the gas to the spatial part and the outflow velocity thereof to a uniform velocity, a velocity distribution and a turbulent condition of the gas flow may be added to an inflow velocity thereof as a component, according to a simulation condition.

Examples of simulation experiments of a sphere made by using the gas flow simulation method of the present invention will be described below in detail.

EXPERIMENT EXAMPLE 1

By using a method similar to that of the first embodiment, a simulation was conducted to analyze an gas flow on the periphery of a spherical model (golf ball), having a diameter of 42.7 mm, which flied in the gas at a velocity of 55 m/s in rotation.

On the surface of the sphere (golf ball), 390 concavities (dimples) each having a diameter of 2.0–4.5 mm and a depth of 0.12–0.18 mm were formed.

The thickness of each latticed division is a dimensionless value. The dimension dh of the latticed division obtained by replacing the dimensionless value with a dimensional value is found as follows: That is, Reynolds number Re (Re=V·D/v) is 154000 in the case where the kinematic viscosity v of the gas is $15.01 \times 10^{-6}$ m$^2$/s, the diameter of the golf ball which is the representative length D is set to 42.5 mm, and the velocity of the spherical model which is the representative velocity V is set to 55 m/s. The thickness dh ($x_3$-direction) of the latticed division disposed immediately over the surface of the spherical model was set to a dimension corresponding to $1.083 \times 10^{-2}$ mm which was the product of $1/10Re^{0.5}$ and the representative length D. Each of the width and height of the latticed division in its longitudinal and widthwise directions ($x_2$-direction and $x_3$-direction) was set to a dimension obtained by dividing the width of the concavity into at least 10×10 to precisely determine the change of the gas flow inside the concavity (dimple).

The inflow velocity $v_1$ of the gas was set to 55 m/s to perform a simulation in the condition where the velocity V of the spherical model 20 was 55 m/s. That is, the situation generated in the experiment 1 was similar to a situation in which the spherical model 20 flied at this velocity.

The condition of the experiment was that the velocity of the gas flow was set to a constant value, the gas was regarded as being uncompressible, the density ρ of the gas was also set to a constant value, and the gas did not slip on the surface of the spherical model, i.e., the velocity component on the surface of the spherical model was set to zero.

Figure 28:
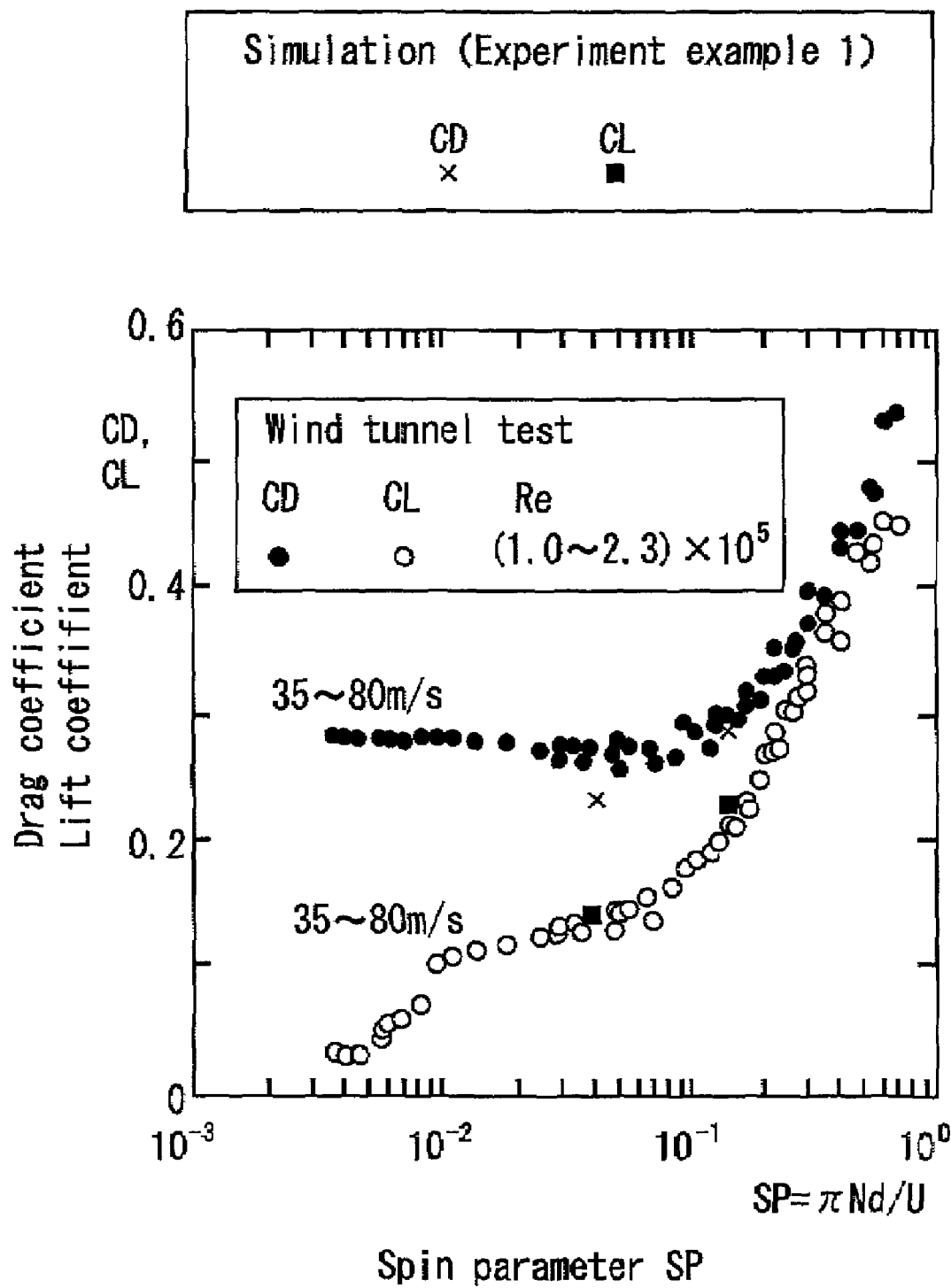
FIG. 28 shows the relationship between a spin parameter and a drag coefficient as well as a lift coefficient.

A simulation was performed by rotating the golf ball at 1000 rpm [SP (spin parameter)=0.0407] and 4000 rpm (SP=0.1626) Supposing that the diameter of the golf ball was d[m], the flight velocity thereof was U[m/s], and the number of rotations thereof was N[rps], and a spin parameter SP=πNd/U. FIG. 28 shows the relationship between the spin parameter SP and a drag coefficient Cd as well as a lift coefficient Cl obtained from the simulation.

FIG. 28 shows the aerodynamic characteristic of the golf ball, prepared on an experimental basis, rotating at a high velocity in an gas flow flowing in a wind tunnel. FIG. 28 plots and shows the relationship between the spin parameter SP and the drag coefficient Cd as well as the lift coefficient Cl, supposing that a wind tunnel test was conducted in a condition in which the flight velocity thereof was set to 35–80 m/S. Although not shown in FIG. 28, the moment coefficient of the golf ball can be computed.

As shown in FIG. 28, it was confirmed that the result of the simulation of the experiment example 1 is similar to that of a wind tunnel test which is conducted by placing a golf ball in a wind tunnel. That is, it could be confirmed that the analysis made by the simulation was similar to that of the phenomenon which occurs when a golf ball actually flies. It could be confirmed from the simulation that a gas flow on the periphery of golf balls having various patterns can be predicted when they fly in rotation by changing the number of rotations thereof and the configuration of its surface.

Examples of simulation experiments of a column made by using the gas flow simulation method of the present invention will be described below in detail.

EXPERIMENTAL EXAMPLE 2

By using a method similar to that of the second embodiment, a simulation was conducted to analyze an gas flow on the periphery of a columnar model, having a radius of 42.5 mm, which flied in the gas at a velocity of 35 m/s, with the columnar model rotating on the axis thereof.

Thirty vertical grooves were formed circumferentially at regular intervals on the surface of the columnar model. The ratio of the depth of the groove to the diameter of a circle at the bottom surface of the columnar model was set to 0.0057.

The thickness of each latticed division is a dimensionless value. The dimension dh of the latticed division obtained by replacing the dimensionless value with a dimensional value is found as follows: That is, Reynolds number Re (Re=V·D/v) is 115500 in the case where the kinematic viscosity v of the gas is $15.01 \times 10^{-6}$ m$^2$/s, the diameter of the golf ball which is the representative length D is set to 42.5 mm, and the velocity of the spherical model which is the representative velocity V is set to 35 m/s. The thickness dh ($x_3$-direction) of the latticed division disposed immediately over the surface of the columnar model was set to a dimension corresponding to $1.25 \times 10^{-2}$ mm which was the product of $1/10Re^{0.5}$ and the representative length D. Each of the width and height of the latticed division in the longitudinal and widthwise directions ($x_2$-direction and $x_3$-direction) was set to a dimension obtained by dividing the width of the groove by ⅛ to precisely determine the change of the gas flow inside the groove.

The inflow velocity $v_1$ of the gas was set to 35 m/s to perform a simulation in the condition where the velocity V of the columnar model 40 was 35 m/s. That is, the situation generated in the experiment 2 was similar to a situation in which the columnar model 40 flied at this velocity.

The flow velocity was set to a constant value, the gas was regarded as being uncompressible, the density ρ of the gas was also set to a constant value, the pressure on the upper surface of the spatial part was set to zero, and the gas did not slip on the surface of the columnar model, i.e., the velocity component on the surface of the columnar model was set to zero.

EXPERIMENT EXAMPLE 3

Except that the ratio of the depth of the groove to the diameter of the columnar model was set to 0.0234, the specification of the experiment example 3 was similar to that of the experiment example 2.

Figure 29:
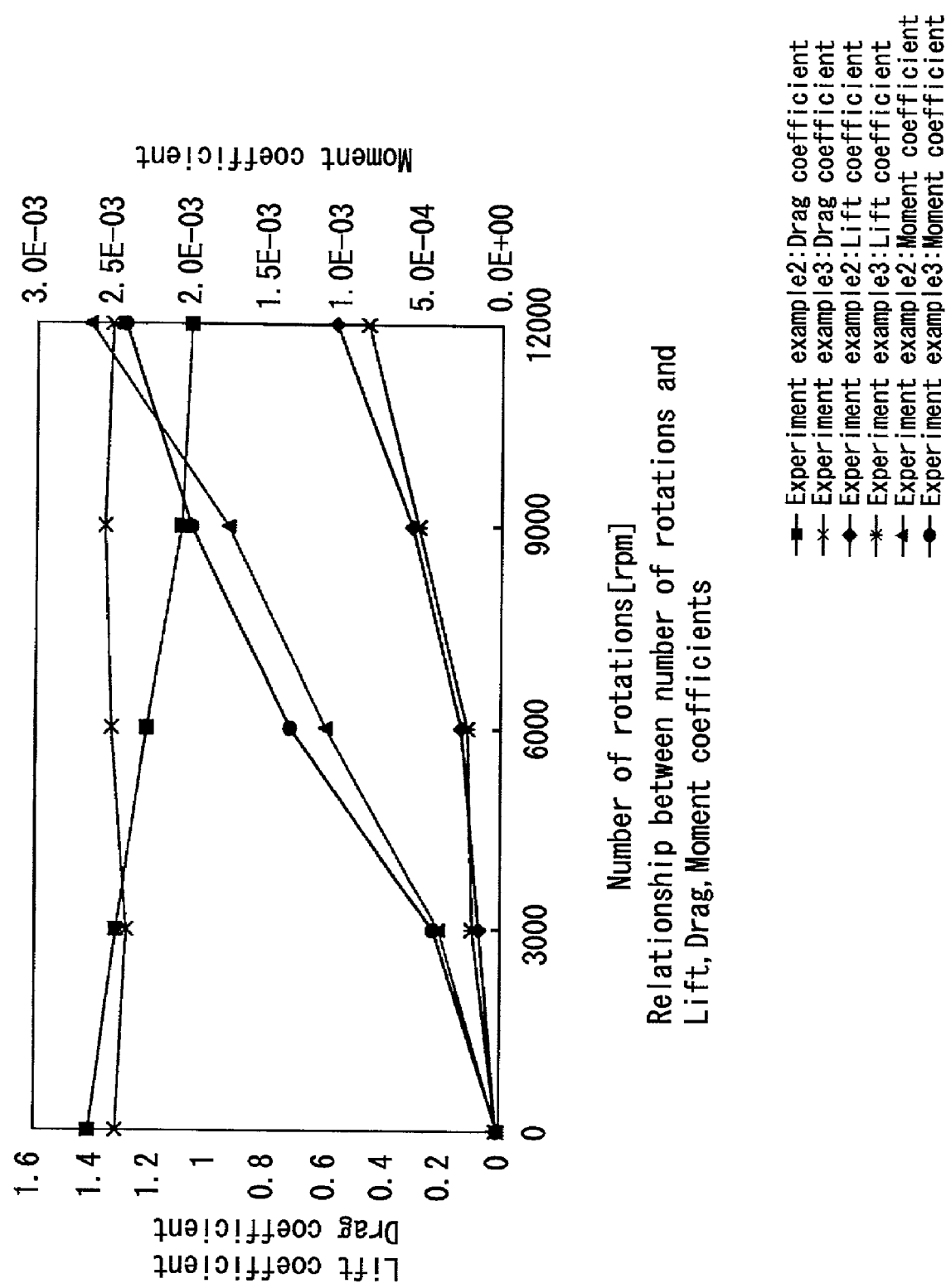
FIG. 29 shows the relationship between the number of rotations of the columnar model and its drag coefficient, lift coefficient as well as moment coefficient.

A simulation was performed by rotating the columnar model at 0 rpm, 3000 rpm, 6000 rpm, 9000 rpm, and 12000 rpm. FIG. 29 shows the relationship between the number of rotations of the columnar model and its drag coefficient Cd, lift coefficient Cl as well as moment coefficient obtained from the simulation.

As shown in FIG. 29, the result of the simulation made in the experiment examples 2 and 3 was that with the increase of the number of rotations, the lift and the moment coefficient increased and that the drag was hardly affected by the number of rotations. FIG. 29 also shows that the experiment example 2 was superior to the experiment 3 in the drag coefficient Cd and the lift coefficient Cl in the range in which the number of rotations was high.

Two kinds of golf balls (spheres) were prepared. They had the same sectional configuration (circular) as that of a sectional surface (circular) parallel with the bottom surface of the columnar model of the experiment examples 2 and 3 respectively. A test of hitting the two golf balls was conducted by using a seven-iron and a nine-iron. Table 1 shows the flight distance (yard) of each golf ball in the hitting test. The number of rotations of the golf ball is supposed to be 3000 rpm to 7000 rpm. The golf ball is capable of flying at the number of rotations shown in FIG. 29.

TABLE 1

|  | Experiment example 2 | Experiment example 3 |
| --- | --- | --- |
| Seven-iron | 141 | 135 |
| Nine-iron | 121 | 118 |

As shown in table 1, the flight distance of the one golf ball having the same sectional configuration as that of the columnar model of the experiment example 2 was 141 yards when the golf ball was hit with the seven-iron and 121 yards when it was hit with the nine-iron. The flight distance of the other golf ball having the same sectional configuration as that of the columnar model of the experiment example 3 was 135 yards when the golf ball was hit with the seven-iron and 118 yards when it was hit with the nine-iron. The flight distance of the former was longer than that of the latter. The result of the hitting test is similar to that of the simulation. It could be confirmed that the analysis made by the simulation was similar to that of the phenomenon that occurs when the golf ball actually flies. It could be confirmed from the simulation that the value of each of the coefficients was changed by varying the configuration of the groove and that the configuration of the groove or concavity of various patterns can be predicted.

As apparent from the foregoing description, according to the present invention, it is possible to easily apprehend a gas flow on the periphery of a rotating spherical model and analyze the change of the gas flow which is made in dependence on the configuration and the like of the concavity or the groove formed on the spherical model. It is also possible to easily apprehend a gas flow on the periphery of a rotating columnar model rotating on its axis and analyze the change of the gas flow which is made in dependence on the configuration and the like of the concavity or the groove formed on the columnar model.

It is easy to generate models of various kinds of models different in the size of concavities or grooves thereof, the configuration thereof, and the arrangement thereof on the imaginary space of a computer. It is possible to evaluate how the configuration and the like of concavities or the grooves affect the gas flow on the periphery of the spherical model objectively and visually by the visualizing software in consideration of the drag, lift, and moment coefficients of the spherical model. Accordingly it is possible to apprehend the change of the gas flow on the periphery of the spherical model, and the change of its drag, lift, and moment coefficients in dependence on different number of rotations thereof. Therefore it is easy to apprehend the behavior of the gas on the periphery of the rotating spherical model.

Since it is also possible to set various conditions on the gas flow, it is possible to perform simulations in consideration of every condition. Compared with experiments which are conventionally made by generating wind in a wind tunnel, the gas flow simulation method is possible to accomplish evaluations in much more conditions in a shorter period of time.

Further, how the configuration and the like of the concavity or the groove of the imaginary object model affect the gas flow is evaluated by only the simulation which is made on the imaginary space of the computer. Thus the present invention eliminates the need for conducting experiments by making many specimens having different specifications. Accordingly it is possible to reduce much time and cost for designing and developing products such as the golf ball.

More specifically, the gas flow simulation method of the present invention reflects favorably on the designing of the sphere such as the golf ball, having the concavity or the groove formed on its surface, which rotates when it flies, thus contributing to efficient development of the golf ball in terms of the disposition, arrangement or the like of dimples. In particular, the gas flow simulation method of the present invention is capable of estimating the behavior of the gas flow and various patterns thereof such as a separation which occurs on the periphery of the golf ball. Therefore the gas flow simulation method analyzes the behavior of the golf ball flying, with a backspin applied thereto and is useful for developing it efficiently.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A gas flow simulation method comprising the steps of:
setting an imaginary object model having at least one concavity, convexity, groove or projection formed thereon by means of a computer;
setting a spatial part on a periphery of said imaginary object model;
dividing a surface of said imaginary object model and said spatial part into a large number of latticed divisions by means of lattice points;
setting said latticed divisions on said surface of said imaginary object model or in a portion of said spatial part in the vicinity of said imaginary object model in supposition of a state in which said imaginary object model is rotating;

flowing a gas to said imaginary object model from one direction of said spatial part;

computing a motion element of a flow of said gas in said spatial part for each latticed division, while said gas is flowing in said spatial part and passing along said surface of said imaginary object model; and simulating said flow of said gas on said periphery of said imaginary object model.

2. The gas flow simulation method according to claim 1, wherein said imaginary object model is supposed to be a spherical model.

3. The gas flow simulation method according to claim 1, wherein said imaginary object model is supposed to be a columnar model; and a state in which said columnar model rotates on an axis thereof is supposed.

4. The gas flow simulation method according to claim 1, wherein said spatial part is divided into a plurality of blocks.

5. The gas flow simulation method according to claim 1, wherein said latticed divisions are formed with structured lattices.

6. The gas flow simulation method according to claim 1, wherein said motion element of said gas flow is a velocity of said gas flow in each axial direction of a three-dimensional space coordinate system, a direction of said gas flow, and a pressure of said gas flow applied to said surface of said imaginary object model, and said motion element is computed at each slight time by using an equation of the law of conservation of mass regarding said gas flow and an equation of the law of conservation of momentum regarding said gas flow.

7. The gas flow simulation method according to claim 1, wherein said latticed division formed in said spatial part is divided into a plurality of regions; and a portion of said spatial part disposed at a downstream side of said imaginary object model is set wide.

8. The gas flow simulation method according to claim 1, wherein based on a result of said computation, a flow direction of said gas flow on said periphery of said imaginary object model and a flow velocity thereof are analyzed by visualizing said flow direction of said gas flow and said flow velocity thereof in terms of a vector direction and a vector length respectively.

9. The gas flow simulation method according to claim 1, wherein based on a result of said computation, a pressure distribution of said gas flow on said periphery of said imaginary object model is analyzed by visualizing said pressure distribution in terms of an isobaric line or a surface connecting equal pressures to each other.

10. The gas flow simulation method according to claim 1, wherein based on a result of said computation, a vorticity distribution of said gas flow on said periphery of said imaginary object model is analyzed by visualizing said vorticity distribution by an isopleth of vorticities or a surface connecting equal vorticities to each other.

11. The gas flow simulation method according to claim 1, wherein based on a result of said computation, a stream line, a trajectory, a particle trace or volume rendering relating to said gas flow on said periphery of said imaginary object model is analyzed by visualizing said stream line, said trajectory, said particle trace or said volume rendering.

12. The gas flow simulation method according to claim 1, wherein based on a result of said computation, a drag coefficient, a lift coefficient, and a moment coefficient of said imaginary object model are computed.

13. The gas flow simulation method according to claim 1, wherein a dimension of said spatial part in a range from said surface of said imaginary object model to an end of said spatial part is set to more than 10 times nor more than 10000 times as long as a dimension of a depth (height of said convexity or said projection) of said concavity or said groove.

14. The gas flow simulation method according to claim 2, wherein said spherical model is a golf ball; said concavity is a dimple; and a gas flow on a periphery of said dimple of said golf ball is simulated.

* * * * *